(12) United States Patent
Martin et al.

(10) Patent No.: US 12,281,982 B2
(45) Date of Patent: Apr. 22, 2025

(54) ULTRAFAST LASER IMAGING WITH BOX LOCK-IN

(71) Applicant: MONSTR Sense Technologies, LLC, Ann Arbor, MI (US)

(72) Inventors: Eric W. Martin, Ann Arbor, MI (US); Torben L. Purz, Nordhorn (DE); Steven T. Cundiff, Ann Arbor, MI (US)

(73) Assignee: Monstr Sense Technologies, LLC, Ann Arbor, MI (US)

( * ) Notice: Subject to any disclaimer, the term of this patent is extended or adjusted under 35 U.S.C. 154(b) by 54 days.

(21) Appl. No.: 18/554,654

(22) PCT Filed: Apr. 20, 2022

(86) PCT No.: PCT/US2022/025503
§ 371 (c)(1),
(2) Date: Oct. 10, 2023

(87) PCT Pub. No.: WO2022/226039
PCT Pub. Date: Oct. 27, 2022

(65) Prior Publication Data
US 2024/0210314 A1 Jun. 27, 2024

Related U.S. Application Data

(60) Provisional application No. 63/176,928, filed on Apr. 20, 2021.

(51) Int. Cl.
*G01N 21/35* (2014.01)
*G01N 21/3563* (2014.01)
*G01N 21/95* (2006.01)

(52) U.S. Cl.
CPC ..... *G01N 21/3563* (2013.01); *G01N 21/9501* (2013.01); *G01N 2021/3568* (2013.01); *G01N 2201/06113* (2013.01)

(58) Field of Classification Search
CPC ........... G01N 21/3563; G01N 21/9501; G01N 2021/3568
See application file for complete search history.

(56) References Cited

U.S. PATENT DOCUMENTS

| 5,565,982 A | 10/1996 | Lee et al. |
| 6,081,127 A | 6/2000 | Wagner et al. |

(Continued)

FOREIGN PATENT DOCUMENTS

| JP | 2004294938 A | 10/2004 |
| JP | 2004348052 A | 12/2004 |

(Continued)

OTHER PUBLICATIONS

Decision of Grant issued in correlated Japanese patent application No. 2023-565150 on Oct. 29, 2024 with translation.

(Continued)

*Primary Examiner* — Hugh Maupin
(74) *Attorney, Agent, or Firm* — Mindful IP PLLC; Michael J. McCandlish

(57) ABSTRACT

An electronic circuit includes signal processing electronics. The electronic circuit receives an electrical signal generated by a photodetector based on a light beam from a location on a material including a signal of interest and one or more modulation frequencies. The electronic circuit discriminates a portion of the electrical signal proportional to a characteristic of the signal of interest from other components of the electrical signal using a low pass filter with a transfer function including a notch at a notch frequency corresponding to one of the modulation frequencies. The electronic circuit determines a value for the characteristic of the signal of interest from the discriminated portion of the electrical signal. The signal processing electronics further outputs the value of the characteristic of the signal of interest.

17 Claims, 13 Drawing Sheets

(56) References Cited

U.S. PATENT DOCUMENTS

| | | | |
|---|---|---|---|
| 6,108,087 A * | 8/2000 | Nikoonahad | G01N 29/348 356/511 |
| 8,817,261 B2 | 8/2014 | Borri et al. | |
| 2008/0225267 A1 * | 9/2008 | Murtagh | G01N 21/1717 356/365 |
| 2008/0231845 A1 | 9/2008 | Grossman et al. | |
| 2009/0310214 A1 | 12/2009 | Brueck et al. | |
| 2014/0043606 A1 | 2/2014 | Ozeki et al. | |
| 2014/0186057 A1 | 7/2014 | Vacondio et al. | |
| 2014/0268131 A1 | 9/2014 | Tamada | |
| 2015/0058388 A1 * | 2/2015 | Smigelski | G06F 17/141 708/208 |
| 2016/0047750 A1 | 2/2016 | Berto et al. | |
| 2020/0271521 A1 | 8/2020 | Sternklar et al. | |
| 2021/0231495 A1 | 7/2021 | Cundiff et al. | |
| 2022/0018773 A1 * | 1/2022 | Prater | G01N 21/636 |

FOREIGN PATENT DOCUMENTS

| | | | |
|---|---|---|---|
| JP | 2004348052 B2 | 12/2004 | |
| JP | 2009039548 A | 2/2009 | |
| WO | 2013084621 A1 | 6/2013 | |
| WO | 2017139747 A1 | 8/2017 | |

OTHER PUBLICATIONS

Office Action issued in correlated Japanese patent application No. 2023-565150, on Sep. 6, 2024, prior to grant.

Responsive Amendments filed in response to the nonfinal office action issued in the correlated Japanese patent application No. 2023-565150 with translation of the claims in the response.

Kasprzak, J.; Patton, B.; Savona, V.; et al. Coherent coupling between distant excitons revealed by two-dimensional nonlinear hyperspectral imaging. Nature Photon 5, 57-63 (2011). https://doi.org/10.1038/nphoton.2010.284.

P.F. Tekavec; G.A. Lott; A.H. Marcus; "Fluorescence-detected two-dimensional electronic coherence spectroscopy by acousto-optic phase modulation," J. Chem. Phys. 127 (21), 214307 (2007).

P. Fimpel; C. Riek; L. Ebner; A. Leitenstorfer; D. Brida; and A. Zumbusch; Appl. Phys. Lett. 112, 161101 (2018); https://doi.org/10.1063/1.5022266.

T. Ideguchi et al., Nature, 502, 355-358 (Oct. 17, 2013).

International Search Report and Written Opinion for PCT/US22/25503 mailed Aug. 2, 2022 (16 pages).

Japan Patent Office Notice of Refusal for Application No. JP2023565150 mailed Jul. 30, 2020 (6 pages; with English machine translation).

* cited by examiner

ULTRAFAST LASER IMAGING WITH BOX LOCK-IN

CROSS-REFERENCE TO RELATED APPLICATION

The present patent application is a national stage of, and claims priority to, Patent Cooperation Treaty Application No. PCT/US2022/025503, filed on Apr. 20, 2022, which application claims priority to U.S. provisional patent application No. 63/176,928 filed on Apr. 20, 2021, entitled "FOUR-WAVE MIXING IMAGING FOR NON-DESTRUCTIVE MEASUREMENT OF MATERIAL PARAMETERS," which applications are hereby incorporated herein by reference in their entireties.

GOVERNMENT LICENSE RIGHTS

This invention was made with Government support under grant number 2015068 awarded by the National Science Foundation. The Government has certain rights to this invention.

BACKGROUND

Random defects in silicon and compound semiconductor materials can degrade or render non-functional circuit elements, optical elements or other functional elements fabricated at the sites of these defects. Standard techniques using light and machine learning algorithms can identify a location of defects but offer little information about the nature of these defects. Ultrafast spectroscopy using lasers can provide additional information regarding the nature of defects. However, current systems are slow and therefore typically not practicable in a production environment.

DETAILED DESCRIPTION

Figure 1:
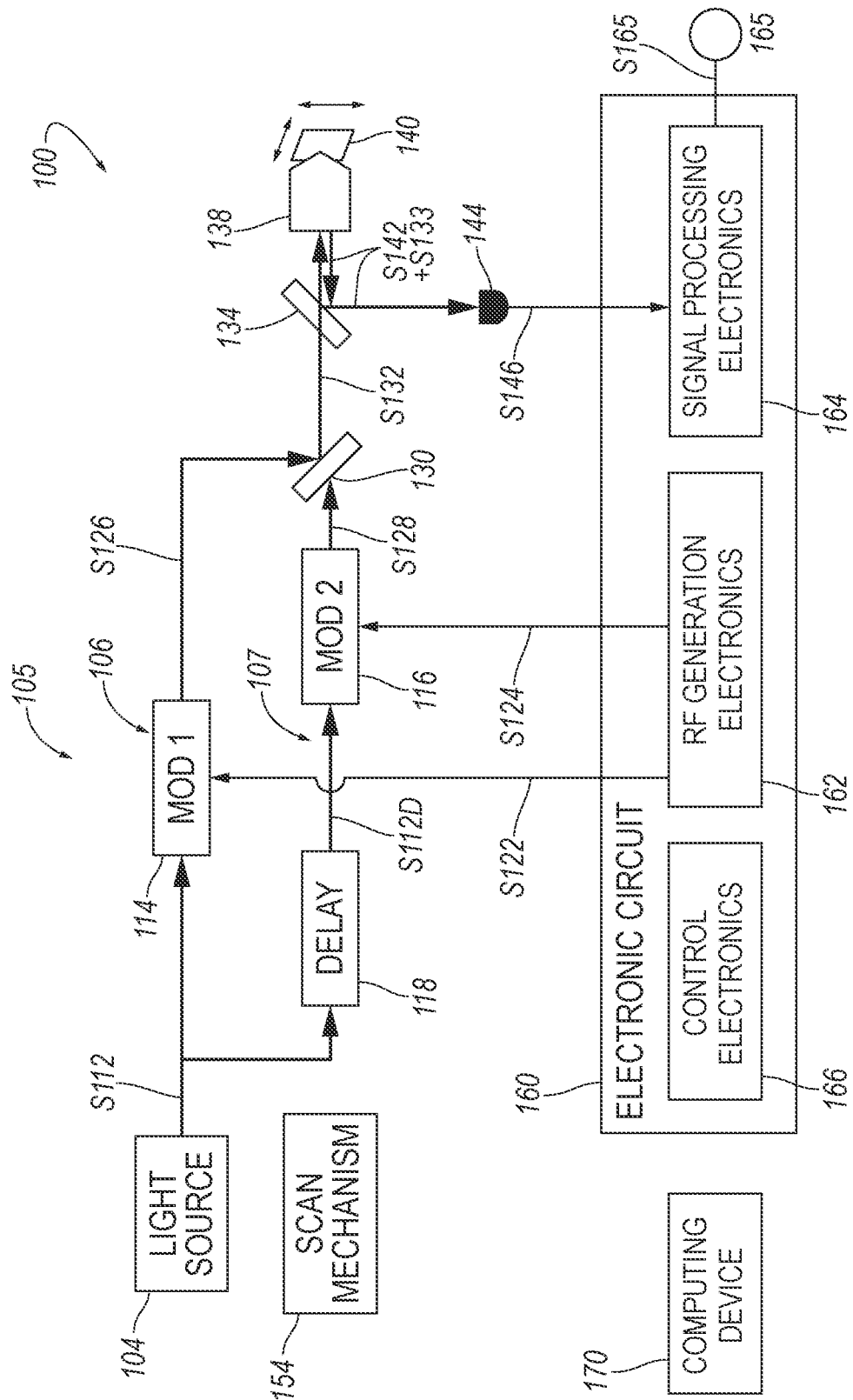
FIG. 1 is a diagram of an example system for detecting characteristics of a material.

Four-wave mixing (FWM) spectroscopy and microscopy utilize a sequence of pulses generated using ultrafast lasers and optical components to measure a material with a third-order nonlinear optical response. In an example, pump-probe measurements can be performed on the material in which a pump light beam amplitude modulated at a first frequency and a probe light beam amplitude modulated at a second frequency are used to excite the material. The material, based on the excitation, generates a non-linear response beam modulated at the difference of the first and second frequency. A photodetector converts the non-linear response beam to an electrical signal. By demodulating the electrical signal and then filtering with a low-pass filter having a transfer function with minimums, also known as notches, at frequencies corresponding to the first and second modulation frequencies, values of characteristics of a signal of interest can be discriminated in a duration that is practicable in a production environment. In a further example, four-wave mixing (FWM) spectroscopy using additional light beams with different modulation frequencies and filtered in a similar manner can provide additional information regarding the material.

Disclosed in an electronic circuit comprising signal processing electronics. The electronic circuit is configured to: receive an electrical signal from a photodetector, wherein the electrical signal is generated by the photodetector based on a light beam from a location on a material including a signal of interest and one or more modulation frequencies; discriminate a portion of the electrical signal proportional to at least one characteristic of the signal of interest from other components of the electrical signal using a filter, wherein the filter transfer function includes a notch at a notch frequency corresponding to one of the modulation frequencies; determine a value for the at least one characteristic of the signal of interest from the discriminated portion of the electrical signal; and output the value of the at least one characteristic of the signal of interest.

In the electronic circuit, the notch frequency corresponding to the modulation frequency can be the modulation frequency.

In the electronic circuit, the notch frequency corresponding to the modulation frequency can be a frequency of a demodulation of the modulation frequency.

In the electronic circuit, the light beam from the location on the material can include a nonlinear optical response from the material.

In the electronic circuit, the nonlinear optical response from the material can be a response to an excitation beam, and the nonlinear optical response further can have a wavelength within a bandwidth of a component of the excitation beam.

In the electronic circuit, the at least one characteristic of the signal of interest can be an amplitude of a non-linear optical response included in the light beam from the location on the material.

In the electronic circuit, the at least one characteristic of the signal of interest further can include a phase of the non-linear optical response.

In the electronic circuit, the filter with the transfer function including the notch frequency corresponding to the modulation frequency can be a low pass finite impulse response filter.

In the electronic circuit, the filter transfer function can include a notch frequency at a frequency corresponding to each of the one or more modulation frequencies, wherein the frequency corresponding to each of the one more modulation frequencies is respectively one of (1) the modulation frequency or (2) a frequency of a demodulation of the modulation frequency.

In the electronic circuit, a wait time of the filter can be an integer multiple of a respective period of each of the notch frequencies corresponding to the respective modulation frequencies.

In the electronic circuit, the wait time of the filter can be less than or equal to one millisecond.

The electronic circuit can be further configured to discriminate the portion of the electrical signal including the at least one characteristic of the signal of interest within the wait time of the filter.

In the electronic circuit, the wait time can be a time during which the filter performs a moving average of received material measurements.

In the electronic circuit, the wait time can be an integer number of a period of pulses in a light beam used to excite the location at the material.

The electronic circuit can be further configured to generate radio frequency signals to modulate a light source at the one or more modulation frequencies.

In the electronic circuit: the modulation frequencies can include a first modulation frequency and a second modulation frequency; and discriminating the signal of interest from the signal received from the photodetector can include demodulating the signal received from the photodetector with a demodulation signal that is a difference of the first modulation frequency and the second modulation frequency.

The electronic circuit, the electronic circuit can be further configured to: receive a second signal from a second photodetector including the first modulation frequency; receive a third signal from either the second or a third photodetector including the second modulation frequency; and generate the demodulation signal by forming a difference of the second signal and the third signal.

In the electronic circuit, a location on the material can be a unit area for which data is collected and stored.

Further disclosed is a system comprising the electronic circuit of any of the preceding claims, further comprising the photodetector.

In the system, photodetector can be a photodiode.

The system can further comprise an optical subsystem, wherein the optical subsystem is configured to generate an excitation beam used to excite the material.

In the system, the optical subsystem can modulate a source light beam with one or more radio frequency signals generated by the electronic circuit to generate the excitation beam.

In the system, the optical subsystem can comprise one or more acousto-optic modulators that modulate the source light beam respectively with the one or more radio-frequency signals.

In the system, the excitation beam can include a pump beam with a first modulation frequency and a probe beam with a second modulation frequency.

The system can further comprise a scan mechanism for changing a relative position of the material to an excitation beam used to excite a location on the material.

The system can further be configured to: scan, via the scan mechanism, multiple locations in a frame, the scanning including: for each location, adjusting a position between the excitation beam and the location; discriminating the signal of interest at the location; storing characteristics of the signal of interest at the location; and moving to a next location, wherein a frame is an area on the material including the multiple locations.

The system can be further configured to: after scanning the multiple locations in the frame, change characteristics of the excitation beam and perform a second scan of the frame.

In the system, changing the characteristics of the excitation beam can include changing a delay between a first modulated light beam at a first modulation frequency and a second modulated beam of light at a second modulation frequency.

The system can be further configured to: compute, after the second scan, an ultrafast decay for respective locations based on the stored characteristics of the respective locations.

The system can be further configured to discriminate the signal of interest at a location, store the characteristics of the signal of interest at the location; and move to the next location within one millisecond.

Further disclosed is a method comprising: illuminating, via a modulated light source, a location on a material with a beam of light including one or more modulation frequencies; detecting, via a photodetector, a signal of interest, wherein the signal of interest is light generated by a nonlinear optical process that results from interaction of the beam of light and the material, wherein the signal of interest comprises spectral components that have frequencies within 1 THz of spectral components of the beam of light; receiving, by an electronic circuit, an electrical signal generated by the photodetector in response to detecting the signal of interest; discriminating a portion of the electrical signal including at least one characteristic of the signal of interest from other components of the electrical signal using a low pass filter with a transfer function including a notch at a notch frequency corresponding to one of the modulation frequencies; and identifying, based on the discriminated portion of the electrical signal, the at least one characteristic of the signal of interest.

In the method, the notch frequency corresponding to the one of the modulation frequencies is the modulation frequency.

In the method, the notch frequency corresponding to one of the modulation frequencies can be a frequency of a demodulation of the modulation frequency.

The method can further comprise outputting the at least one characteristic of the signal of interest.

In the method, the at least one characteristic of the signal of interest can be an amplitude of a non-linear optical response included in the light beam from the location on the material.

In the method, the at least one characteristic of the signal of interest further can include a phase of the signal of interest.

In the method, the filter with the transfer function including the notch frequency corresponding to the modulation frequency can be a low pass finite impulse response filter.

In the method, the filter transfer function can include a notch frequency corresponding to each of the one or more modulation frequencies, wherein corresponding to each of the one or more modulation frequencies is respectively one of (1) the modulation frequency or (2) a frequency of a demodulation of the modulation frequency.

In the method, a wait time of the filter is an integer multiple of a respective period of each of the modulation frequencies.

In the method, the wait time of the filter can be less than or equal to one millisecond.

In the method, discriminating the portion of the electrical signal including the at least one characteristic of the signal of interest can be performed within the wait time of the filter.

In the method, the wait time is a time during which the filter performs a moving average of received material measurements.

In the system, the wait time can be an integer number of a period of pulses in a light beam used to excite the location at the material.

The method can further comprise generating radio frequency signals to modulate a light source at the one or more modulation frequencies to generate the beam of light including the one or more modulation frequencies.

In the method, the modulation frequencies include a first modulation frequency and a second modulation frequency; and discriminating the signal of interest from the signal can include demodulating the signal received from the photodetector with a demodulation signal that is a difference of the first modulation frequency and the second modulation frequency.

The method can further comprise: receiving a first signal including the first modulation frequency; receiving a second signal including the second modulation frequency; and generating the demodulation signal by forming a difference of the first signal and the second signal.

The method can further comprise: scanning multiple locations in a frame, the scanning including: for each location, adjusting a position between the light beam and the location; discriminating the signal of interest at the location; storing characteristics of the signal of interest at the location; and moving to a next location, wherein a frame is an area on the material including the multiple locations.

In the method, discriminating the signal of interest at a location, storing the characteristics of the signal of interest at the location; and moving to the next location can be completed within one millisecond.

Further disclosed is a system configured to execute the method above.

FIG. 1 illustrates an example system 100 for performing pump-probe measurements with modulated light beams to determine characteristics of a material 140. The system 100 includes a light source 104, an optical subsystem 105, a photodetector 144, a scan mechanism 154, and an electronic circuit 160. The electronic circuit 160 further includes a port 165 for outputting an output signal S165. The system 100 may further include a computing device 170.

The light source 104 generates a source light beam comprising a train of pulses (source beam S112). As an example, an ultrafast laser can be used as the light source. An example of a commercially available ultrafast laser is the Chameleon Discovery NX, manufactured by Coherent at address 5100 Patrick Henry Drive, Santa Clara, CA 95054.

The source beam S112 may typically have a repetition frequency in a range from 100 kilohertz (kHz) to 1 gigahertz (GHz). In an example, the repetition frequency is 120 megahertz (MHZ) such that the time between pulses is approximately 8.3 nanoseconds (ns). The pulses generated by the ultrafast laser typically have a length of less than a picosecond (ps), for example, 150 femtoseconds (fs). The center wavelength of the laser is typically between 300 and 2000 nanometers (nm), where this selection is based on the material being measured. The bandwidth of a typical ultrafast laser is 5-35 terahertz (THz). The laser, or any beam created by the laser, can be further broadened using continuum generation to up to 500 THz. The spectrum of at least one of the beams, created by the light source and possible continuum generation, must cover wavelengths that are relevant for studying the specific material of interest. For example, a light source with a center wavelength near 790 nm and at least 5 THz bandwidth can be used to measure the room temperature exciton resonance in a monolayer of $MoSe_2$.

The optical subsystem 105 includes a first modulator 114 (MOD_1), a second modulator 116 (MOD_2), a delay block 118, a first beam splitter 130, a second beam splitter 134, and a lens 138.

The first modulator 114, and the second modulator 116 are devices that can modulate a received optical signal based on a frequency, phase and amplitude of a received radio frequency (RF) signal. As an example, the first modulator 114 and second modulator 116 can be acousto-optic modulators (AOMs). An example of a commercially available acousto-optic modulator is M1407-SF80L-0p5 manufactured by Isomet at address 10342 Battleview Parkway, Manassas, VA 20109. Alternatively, the first and second modulators 114, 116 may be electro-optic modulators or mechanical intensity modulators such as choppers.

As shown in FIG. 1, the optical subsystem 105 contains two optical signal paths from the light source 104 to the first beam splitter 130; a first optical path 106 and a second optical path 107. The first optical path 106, which can also be referred to as the pump path 106, includes the first modulator 114. The second optical path 107, which can also be referred to as the probe path 107, includes the delay block 118 and the second modulator 116.

In the first optical path 106, the first modulator 114 amplitude modulates the source light beam S112 based on first radio frequency (RF) signal S122 having a first frequency $\Omega1$ to generate a first modulated light beam S126. The first frequency $\Omega1$ is a lower frequency than the repetition frequency of the source light beam S112, in cases where a periodic light source is used. The modulated light beam S126 can also be referred to herein as the pump beam S126.

In the second optical path 107, the second modulator 116 modulates the source light beam S112 based on a second RF signal S124 with a second frequency $\Omega2$, to generate a second modulated light beam S128. The second frequency $\Omega2$ is different from the first frequency $\Omega1$ and is lower than the repetition frequency of the source light beam S112, in cases where a periodic light source is used. The modulated light beam S128 can also be referred to herein as the probe beam S128.

The delay block 118 can be used to adjust a timing of the pump beam S126 relative to the probe beam S128. In an example, the delay block 118 is a mirror with an adjustable position that allows for adjusting a length of an optical path and therefore a transit time of a light beam being reflected by the mirror from the light beam source to the light beam destination. In the second optical path 107, the delay block 118 receives as an input the source beam S112 from the light source 104 and outputs a delayed copy of the source beam S112D to the second modulator 116, wherein the delay is adjustable.

The first optical path 106 and the second optical path 107 meet at the first beam splitter 130, where the pump beam 126 and the probe beam S128 are combined to form the excitation beam S132 (=S126+S128), wherein the timing of the pulses in the probe beam S128 are adjusted relative to the timing of the pump beam S126 based on the delay generated by the delay block 118.

The lens 138 receives the excitation beam S132 (after it passes, unchanged, through the second beam splitter 134), and directs the excitation beam S132 to a location on the material 140. In a nonlinear interaction between the excitation beam S132 and the material 140, the material 140 generates a non-linear response beam S142. The nonlinear response beam S142 is a light beam, with an optical spectrum that is contained within the bandwidth of the probe beam S128. More specifically, all spectral components of this nonlinear response beam are within 1 THz of spectral components of the probe beam S128. The nonlinear response beam S142 can also be referred to herein as the signal of interest S142. The reason for this distinction is that nonlinear optical processes create light with new wavelengths, but the nonlinear signals that are nearly degenerate, i.e., having nearly the same wavelength with the probe beam, cannot be isolated using an optical spectral filter. Because an optical spectral filter cannot be used to isolate the nonlinear signal, electrical filtering such as the technique disclosed here is required. The material 140 additionally emits and/or reflects a linear response beam S133 in response to the excitation beam S132. The linear response beam S133 includes the same spectral components as the excitation beam S132.

The nonlinear response beam S142 passes back through the lens 138 to the second beam splitter 134, together with the linear response beam S133. The beam splitter 134 is so arranged that the nonlinear response beam S142 and the linear response beam S133 are then directed towards a photodetector 144.

The photodetector 144, which can be a photodiode, detects the non-linear response beam S142 along with the linear response beam S133. Based on the excitation from the non-linear response beam S142 and the linear response beam S133, the photodetector 144 generates the (electrical) photodetector output signal S146. The photodetector output signal S146 is input to the electronic circuit 160. The electronic circuit 160 processes the photodetector output signal S146 to extract values of one or more characteristics of the signal of interest S142 as described below in reference to FIGS. 2 and 5A-5E. The values of the one or more characteristics of the signal of interest S142 include an amplitude and can include a phase of the signal of interest S142.

The system 100 includes a scan mechanism 154 to adjust/change a position of the excitation beam 132 relative to the material 140. In an example, the scan mechanism 154 translates or rotates the material 140. After completing a measurement at a location, the material 140 can be displaced such that the lens 138 of the system 100 is directed toward another location on the material 140. A location can also be referred to herein as a pixel, wherein a pixel is a unit area on the material 140 for which data is collected and stored during the measurement process. Alternatively, some scan mechanisms 154 provide for moving the excitation beam 132 relative to the material 140 using a galvanometer scanner in the optical path of the lens 138 (typically a microscope objective), while holding the material 140 stationary.

The electronic circuit 160 can perform multiple operations for the system 100 including generating RF signals for generating the pump beam S126 and probe beam S128, adjusting parameters of the optical subsystem such as the delay generated by the delay block 118, discriminating the photodiode output signal S146 to determine values of characteristics of the signal of interest S142, controlling the scan mechanism 154 and other elements of the system 100 such as the light source 104, and outputting the values of the characteristics of the signal of interest S142 as digital values to a computing device such as the computing device 170 or a display, or outputting the values as an analog output signals. The electronic circuit 160 includes electronic components such as resistors, capacitors, inductors, and transistors. It further includes logic elements such as logic gates, flip-flops, and registers. Still further, it can include one or more processors and one or more data storage elements. In an example, the electronic circuit 160 can include a storage element that stores instructions for a processor for setting up, adjusting, or performing operations with other elements in the system 100 and can also store collected data from the material 140. The electronic circuit 160 can be or include one or more FPGAs, integrated circuits and/or circuits on printed circuit boards or substrates such as ceramic substrates.

As shown in FIG. 1, the electronic circuit 160 can include one or more subcircuits including an RF generation subcircuit 162, a signal processing subcircuit 164 and a control subcircuit 166. Each of these subcircuits can be one, or any combination of a software module, a firmware module or a hardware module that performs the functions related to the respective subcircuit.

The RF generation subcircuit 162 can generate RF signals for modulating the source light beam S112 to generate modulated light beams such as the pump light beam S126 and probe light beam S128. Specifically, in the example of FIG. 1, the RF generation subcircuit 162 generates the first RF signal S122 with a first frequency $\Omega_1$ and the second RF signal S124 with a second frequency $\Omega_2$.

The signal processing subcircuit 164 receives and processes the output signal S146 from the photodetector 144 to determine values of characteristics of the signal of interest S142 included in the output signal S146. The operation of the signal processing subcircuit 164 is described below in reference to FIG. 2.

The control subcircuit 166 can control the operation of the system 100. The control subcircuit 166 can, for example, select the frequencies $\Omega_1$ and $\Omega_2$ of the respective signals S122 and S124 generated by the RF generation subcircuit 162, and select the delay generated by the delay block 118. The control subcircuit 166 can further select parameters for the signal processing performed in the signal processing subcircuit 164 such as a demodulation frequency and parameters for signal filtering such as the type of filter to be used, the coefficients of the filter, and one or more time constants of the filter, which determines the pixel wait time. The control subcircuit 166 can further control parameters such as the step vector (length and direction) and step timing of scanning performed by the scan mechanism 154. Still further, the control subcircuit 166 can control outputting of data collected by electronic circuit 160 during measurement of the material 140.

As will be described below, the control subcircuit 166 can select the frequencies generated by the RF generation subcircuit 162 and parameters of filtering performed in the signal processing subcircuit 164 such that frequencies corresponding to the modulation frequencies of the pump beam S126 and probe beam S128 applied to the material 140 are suppressed by notches in the transfer function of the filtering applied by the signal processing subcircuit 164. As described below, in some cases, the frequencies corresponding to the modulation frequencies are the actual modulation frequencies. In other cases, the frequencies corresponding to the modulation frequencies are frequencies resulting from demodulation of the modulation frequencies with a demodulation signal. The electronic circuit 160 further includes a port 165 for outputting data from the signal processing subcircuit 164 to devices such as the computing device 170, a display, or a measurement device such as an oscilloscope. The port 165 can include one or more electrical connections to support different digital bus configurations or the outputting of one or more analog signals.

The system 100 may further include a computing device 170. The computing device 170 may be laptop computer, desktop computer, mobile telephone, etc. The computing device 170 may include one or more processors and one or more memories and may be programmed to receive digital communications, for example according to a wireless standard such as IEEE 802.11, Bluetooth, or via wired communications such as a Universal Serial Bus (USB), Ethernet, or a Peripheral Component Interconnect (PCI).

The computing device 170 may further be programmed to receive an output S165 from the electronic circuit 160, wherein the output can be digital data indicating a value proportional to a characteristic of the signal of interest S142 for locations on the material 140. The computing device 170 may store the value together with its respective locations on the material 140. The computing device 170 may further be programmed to present the data graphically, for example on a display, such that characteristics of the material at locations, such as defects, can be identified.

Figure 2:
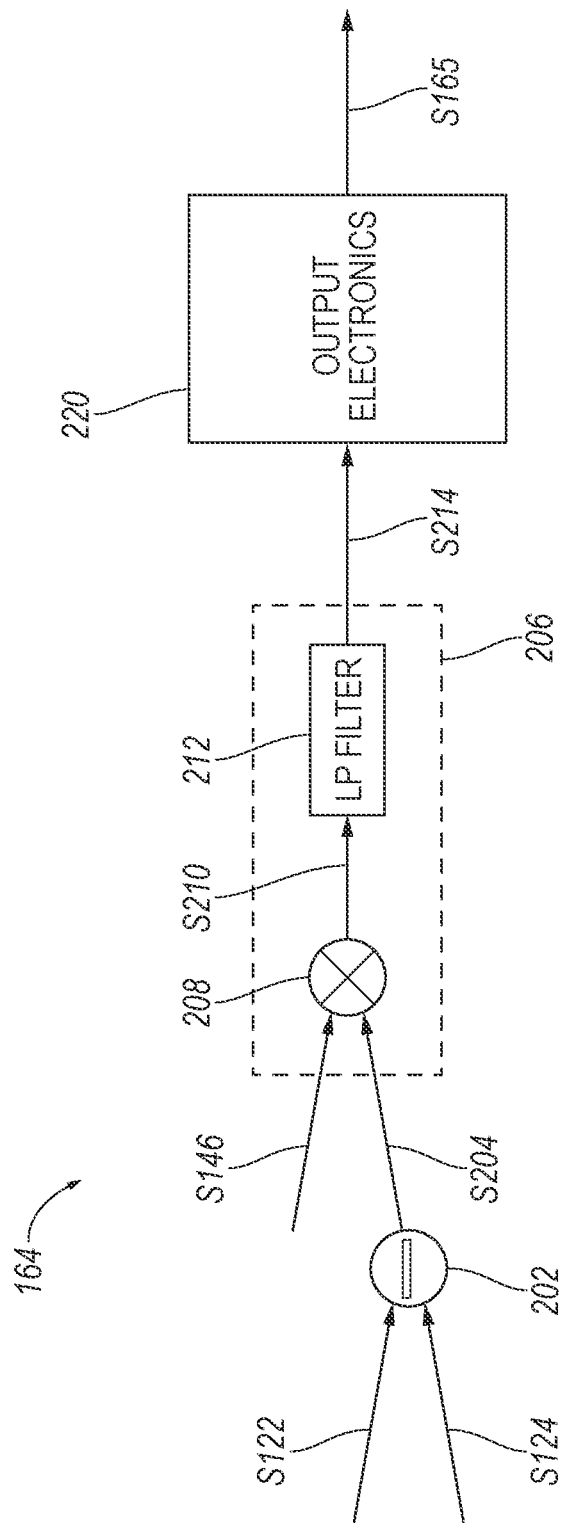
FIG. 2 is a schematic diagram of an example signal processing subcircuit for processing a response signal in the system of FIG. 1.

FIG. 2 is a block diagram illustrating the signal processing performed in the signal processing subcircuit 164. As shown in FIG. 2, the signal processing subcircuit 164 includes a difference generator 202, a lock-in-type detector 206, and output electronics 220. In an example, the lock-in-type detector 206 includes a mixer 208 and a low-pass filter 212. In the case where the low-pass filter 212 is a moving average filter, the lock-in-type detector 206 is referred to as a box lock-in detector. The signal processing subcircuit 164 can be programmed, for example, to adjust parameters of the filter 212 such as the type of filter, the coefficients of the filter 212, and the time constant or time constants of the filter 212.

The difference generator 202 in the signal processing subcircuit 164 receives the modulation signal S122 with a frequency of $\Omega_1$ and modulation signal S124 with a frequency of $\Omega_2$ as inputs and generates a difference signal S204 with a frequency equal to $\Omega_1 - \Omega_2$. The difference signal S204 can be referred to herein as the demodulation signal S204.

As a next step, the lock-in-type detector 206 in the signal processing subcircuit 164 receives as an input the photodetector output signal S146. In this example the lock-in-type detector 206 includes a mixer 208 and a low-pass filter 212. The mixer 208 mixes the photodetector output signal S146 with the demodulation signal S204. The output of the mixer 208 is a signal S210. The signal S210 includes signals at multiple frequencies based on the frequencies in the photodetector output signal S146 and the demodulator signal S204, including a signal at 0 Hz (zero Hertz). The signals at the multiple frequencies (excluding the signal at 0 Hz) include demodulations of the modulation frequencies of the pump signal S126 and the probe signal $128. The signal at 0 Hz includes values of characteristics of the signal of interest. Specifically, at least the amplitude of the signal at 0 Hz is proportional to the amplitude of the signal of interest S142.

The low-pass filter 212 filters the signal S210 to discriminate a portion of the electrical signal S146 including a value proportional to at least one characteristic of the signal of interest S142 from other components of the electrical signal S146 and generate a signal S214. The resulting signal S214 includes at least one characteristic of the signal of interest S142. In an example, the low-pass filter 212 is a moving average filter, in which case the lock-in-type detector 206 is referred to as a box lock-in detector 206. The moving average filter is characterized in that it performs a moving average of a fixed number of samples in the time domain and having one or more notches in a transfer function of the filter 212 in the frequency domain. The moving average filter is further characterized by a wait time, which is equal to the number of samples included in the moving average multiplied by the period of a sample.

As described below, in reference to FIGS. 5A-5E, designing the moving average filter such that the notches in the transfer function correspond to the modulation of frequencies in the excitation beam 132 can result in strong suppression of the signals included in the excitation beam 132 with a wait time that is relatively short, in comparison to the time constant of traditional exponential low-pass filters. Placing the notches of the transfer function of the moving average filter can be achieved by selecting a wait time that is an integer number of periods of the modulations to be suppressed and designing the system 100 such that all the modulation periods are integer multiples of the sample period. In order to measure characteristics of the signal of interest, the wait time must also be an integer number of periods of the fundamental modulation frequency of the signal of interest, and the fundamental modulation frequency of the signal of interest must not be a harmonic of any other modulation frequency. Here, a sample rate equal to the repetition rate of pulses in the source light beam S112 is used, and the sample period is the time between the pulses. When these moving average filter conditions are correctly set, the transfer function of the moving average filter 212 in the box lock-in detector 206 has notches at frequencies corresponding the modulation frequencies of the excitation beam 132 such that the box-lock-in detector 206, including the mixer 208 and the moving average filter 212, effectively suppresses the modulation frequencies of the pump beam S126 and the probe beam S128.

The output electronics 220 receives the signal S214 including the value proportional to the characteristic of the signal of interest S142 and generates an output signal that is output to the port 165. In an example, the output signal S165 can be a digital value that is output via the port 165 to a computing device such as the computing device 170, a digital value output to a display, or an analog value that is output to the port 165 that can be received by an analog measuring device such as an oscilloscope. In some cases, the output electronics 220 may output the signal S214 directly to the port 165. In other cases, the output electronics may convert the signal S214 to a format for transmission via a bus such as a Universal Serial Bus (USB). In other cases, the output electronics 220 may convert the digital signal S214 to an analog signal using, for example, a digital to analog converter, and output an analog signal that is proportional to a characteristic of the signal of interest S142.

FIGS. 3A-E illustrate optical signals (beams) and electrical signals in the time domain at various points within the system 100 for an example application.

Figure 3A:
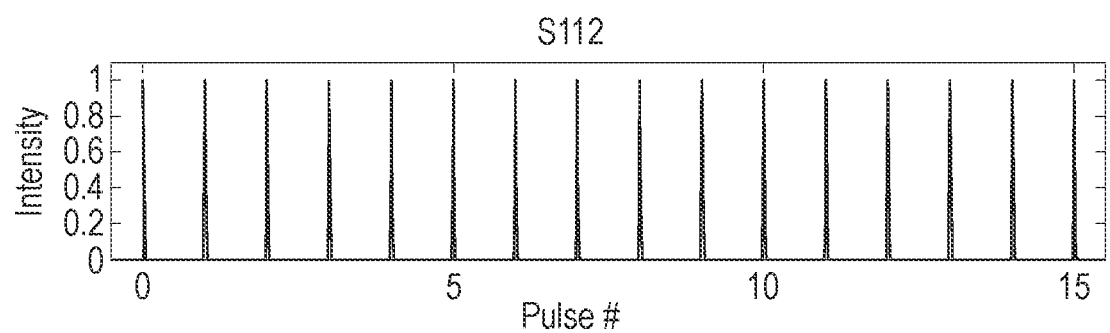
FIGS. 3A-3E are example time domain representations of signals in the example system of FIG. 1.

FIG. 3A illustrates a source beam S112 coming from the light source 104 in the time domain. In an example, the repetition frequency of the source beam S112 (i.e., the pulse frequency) is 120 MHz, resulting in a period of the pulses of approximately 8.3 ns.

Figure 3B:
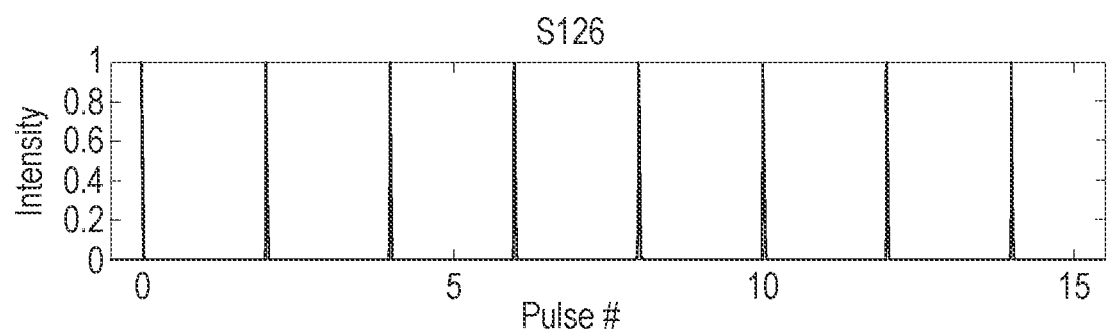
Figure 3C:
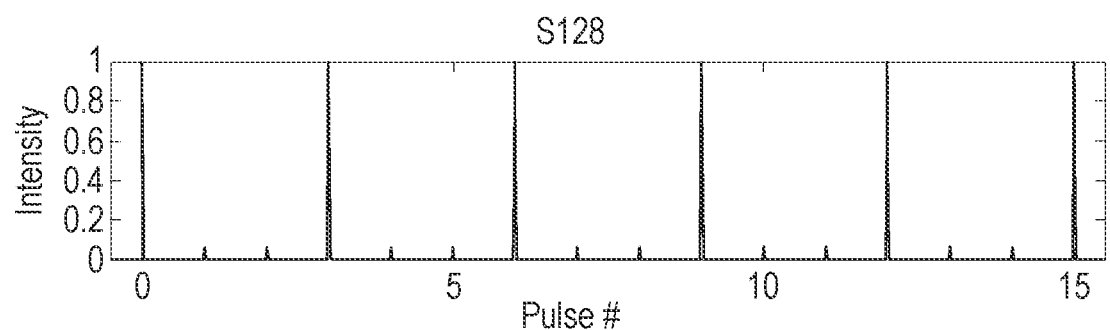

In the example, the RF generation subcircuit 162 generates a first signal S122 having a first frequency $\Omega_1$ of 60 MHz and a second signal S124 having a second frequency of 40 MHZ. The first signal S122 is used to amplitude modulate, via the first modulator 114, the source beam S112 to generate the pump beam S126. The second signal S124 is used to amplitude modulate, via the second modulator 116, the source beam S112 to generate the probe beam S128. FIG. 3B shows the pump beam S126 in the time domain. FIG. 3C shows the probe beam S128 in the time domain.

Figure 3D:
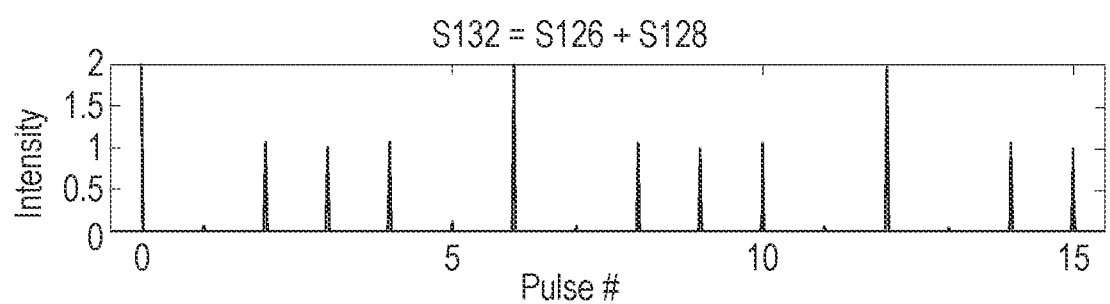

The second beam splitter 134 combines the pump beam S126 and probe beam S128 into a single excitation beam S132. The excitation beam S132 is shown in the time domain in FIG. 3D. In this example, the delay generated by the delay block 118 is set to zero, so that there is no temporal offset between the pump beam S126 and the probe beam S128. As shown in FIG. 3D, the excitation beam S132 has pulses at each of the pulses of pump beam S126 and the probe beam S128. At pulse repetitions 0, 6 and 12 (shown pulse number from the source beam S112) the pump beam S126 and probe beam S128 are both at a maximum. In systems with a non-zero delay, the probe beam S128 would have a delay with respect to the pump beam S126.

Figure 3E:
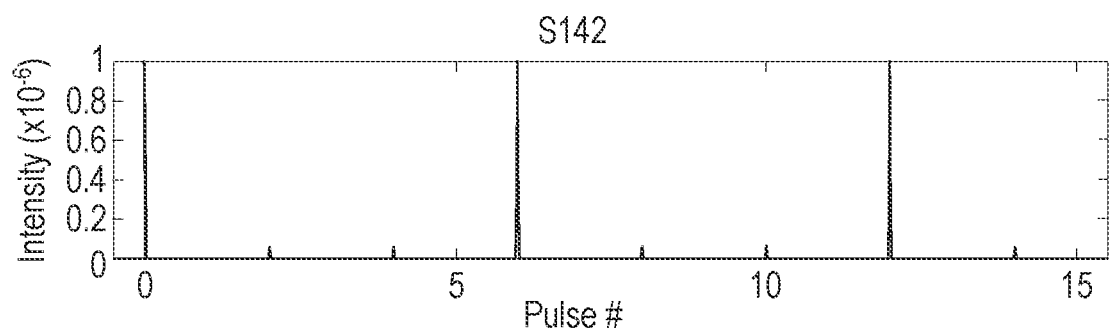

The excitation beam S132, as described above, is directed to the material 140 via the lens 138. The material 140, via interaction with the excitation signal S132, generates the non-linear response beam S142, which can also be called a pump-probe signal S142 or a signal of interest S142. FIG. 3E shows the non-linear response beam S142 in the time domain. As can be seen, the non-linear response beam S142 only has peaks in the time domain at those times that the pump beam S126 and the probe beam S128 coincide. Note that the pump beam S126 and probe beam S128 do not need to overlap in time to generate a pulse in the non-linear response signal S142.

Rather, the probe beam S128 must occur within a time period during which the sample exhibits a measurable response to the pump beam S126, called the sample decay time. The sample decay time is a property that is intrinsic to the substance being measured, and it can range from less than 1 fs to more than 1 s.

FIGS. 4A-D show selected signals of the system 100 in the frequency domain, based on the example described above.

Figure 4A:
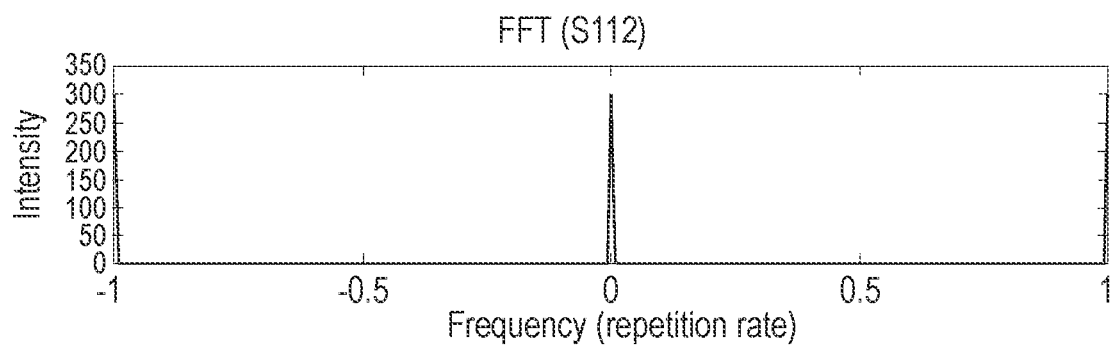
FIGS. 4A-4D are example frequency domain representations of signals in the example system of FIG. 1.

FIG. 4A is a representation of the source beam S112 in the frequency domain. It shows radio frequency components at DC and every harmonic of the laser repetition rate. This is the set of integers in the FIG. 4A. In the example, where the repetition frequency is 120 MHZ, the radio frequency spectrum has a feature at every harmonic of 120 MHz that is within the photodetector 144 bandwidth.

Figure 4B:
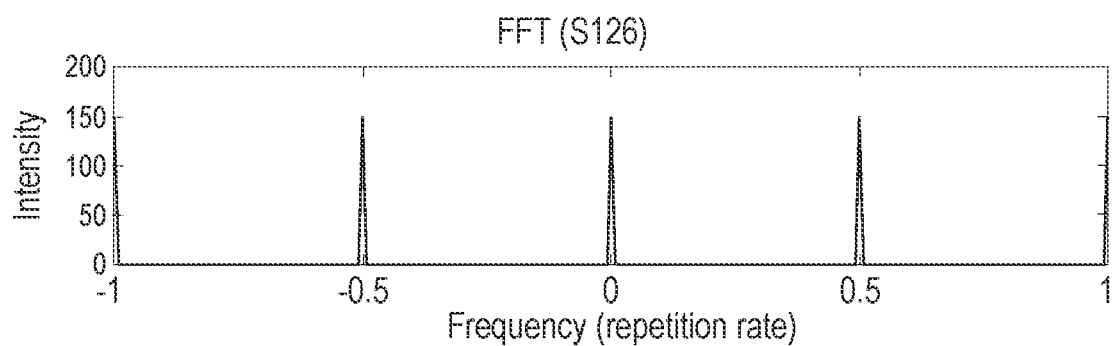

FIG. 4B is a graph of the pump beam S126 in the frequency domain. It has prominent features at harmonics of 0.5 frequency repetition units, where this is the pump modulation frequency $\Omega_1$. In this example, the pump modulation frequency $\Omega_1$ is 60 MHZ.

Figure 4C:
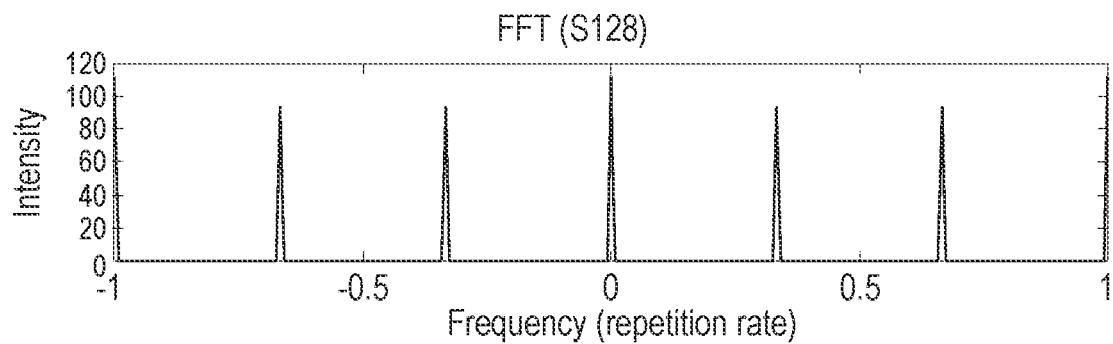

FIG. 4C shows a graph of the probe beam S128 in the frequency domain. It has prominent features at harmonics of 0.33 repetition units, where this is the probe modulation frequency $\Omega_2$. In this example, the probe modulation frequency $\Omega_2$ is 40 MHZ.

Figure 4D:
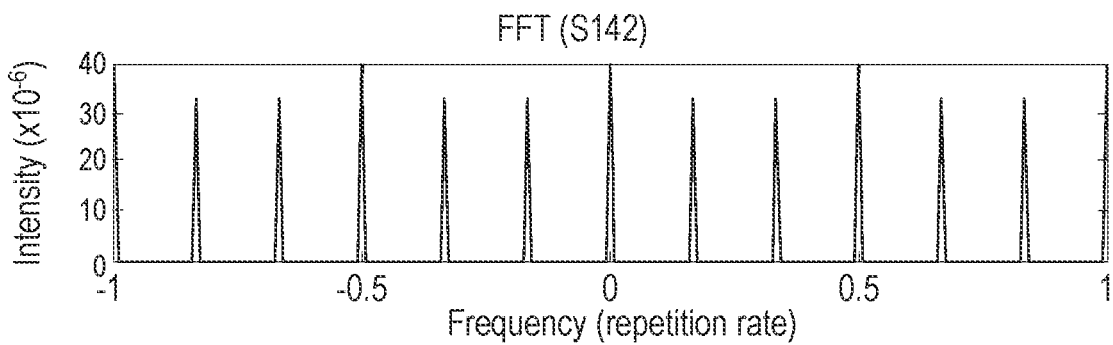

FIG. 4D shows a graph of the response beam S142. The response beam S142 includes a peak at 0.17 repetition frequency units, corresponding to the difference between $\Omega_1$ and $\Omega_2$. Though this feature is unique, it is important to recognize that response signal S142 is very weak, typically at least 6 orders of magnitude lower than the other signals impinging on the photodetector 144. In order to discriminate this feature, which includes the signal of interest, the data processing needs to strongly suppress, for example by a factor of 107, the modulation frequencies $\Omega_1$ and $\Omega_2$ in S142 resulting respectively from the pump beam S126 and the probe beam S128.

Figure 5A:
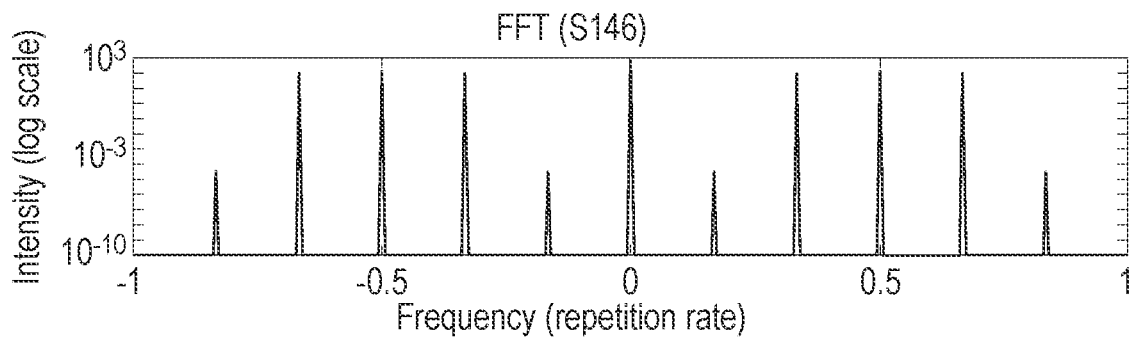
FIG. 5A is a frequency domain representation of a signal received from a photodetector in the example system of FIG. 1 before demodulation.

FIG. 5A is a graph in the frequency domain of the photodetector output signal S146. As can be seen, it includes a peak at 0.17 repetition units. This peak is proportional to the signal of interest.

The mixer 208 in the signal processing subcircuit 164 demodulates the signal S146 with a demodulation signal S204 to generate the demodulated output signal S210. Here, the demodulation signal S204 has a frequency of $\Omega_1 - \Omega_2$.

Figure 5B:
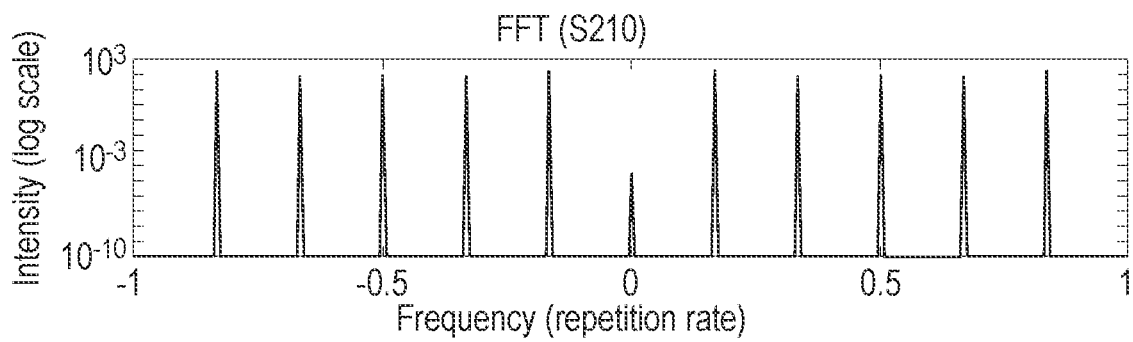
FIG. 5B is a frequency domain representation of the signal received from the photodetector in the example system of FIG. 1 after demodulation.

FIG. 5B is a graph of the demodulated output signal S210 in the frequency domain. The feature at DC, or zero Hertz, is the signal of interest.

Figure 5C:
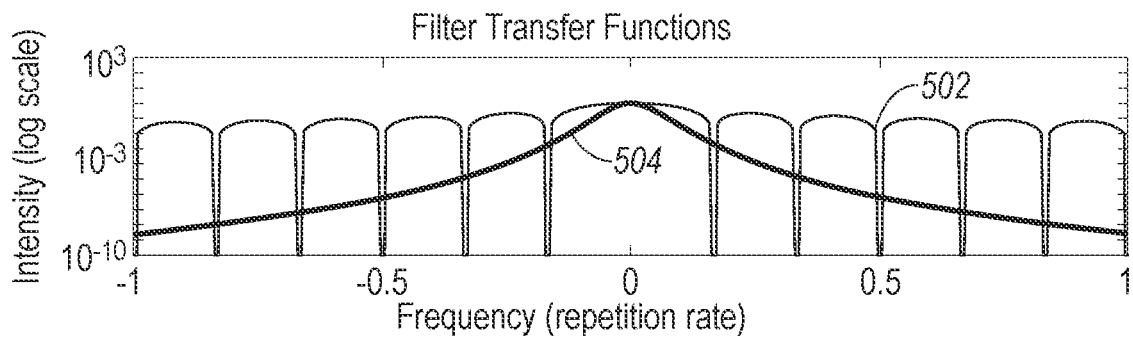
FIG. 5C shows transfer functions of an example exponential low-pass filter and an example moving average filter.

As discussed above, in reference to FIG. 2, following demodulation, the signal S210 is filtered. Conventionally, a low-pass exponential filter is applied following demodulation with a mixer, resulting in signal processing that is identical to the signal processing of a standard lock-in detector, called here an exponential lock-in detector. An exponential filter is defined by its time constant which sets the decay time of its exponential transfer function, and the filter order. FIG. 5C shows an example of a transfer function 504 for a fourth-order low-pass exponential filter.

As an alternative, a simple moving average filter can be used as a low-pass filter 212. The resulting system comprising the mixer 208 and moving average filter 212 is called here a box lock-in detector 206. FIG. 5C shows an example transfer function 502 for a moving average filter 212 with the shortest possible integration time, where the shortest integration time is a single period of the nonlinear signal modulation equal to $1/(\Omega_1 - \Omega_2)$. As can be seen, the transfer function 502 of the moving average filter has multiple notches. Signals that occur at these notches are more strongly suppressed than other signals.

Figure 5D:
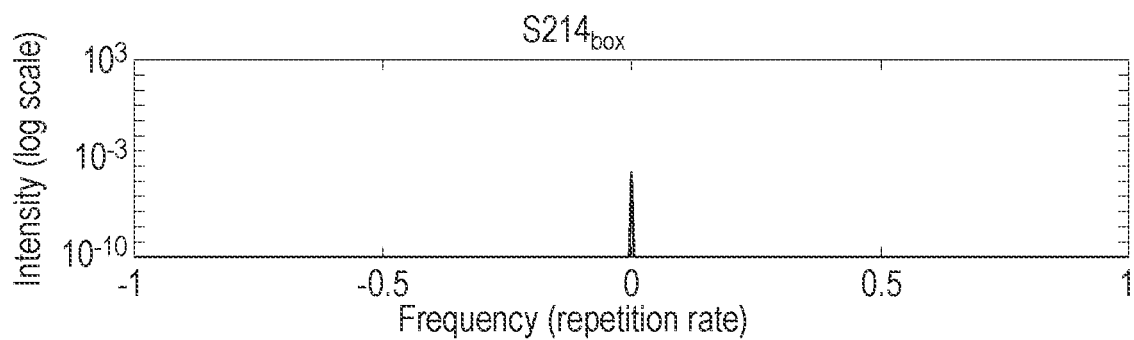
FIG. 5D is a graph in the frequency domain of an example filter output signal after filtering with an example box lock-in detector including the moving average filter of FIG. 5C.
Figure 5E:
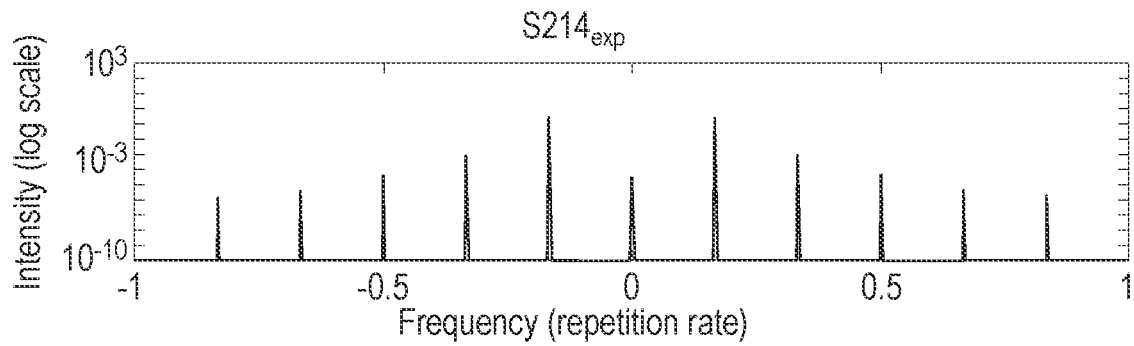
FIG. 5E is a graph in the frequency domain of an example filter output signal after filtering with the example exponential lock-in filter of FIG. 5C.

FIG. 5D shows the result S214$_{box}$ of filtering the signal S146 with the box lock-in detector, which includes both a mixing step and low-pass filtering with the transfer function 502. FIG. 5E shows the result S214$_{exp}$ of filtering the signal S146 with the exponential lock-in detector, which includes both a mixing step and low-pass filtering with the transfer function 504. As can be seen, demodulation frequencies including demodulation frequencies resulting from the demodulation of the modulation frequencies associated with the pump beam S126 and probe beam S128 are suppressed in the signal $S214_{box}$ that was filtered with the box filter. These demodulation frequencies remain present in the signal $S214_{exp}$ that was filtered with the exponential filter.

Figures 6A, 6B:
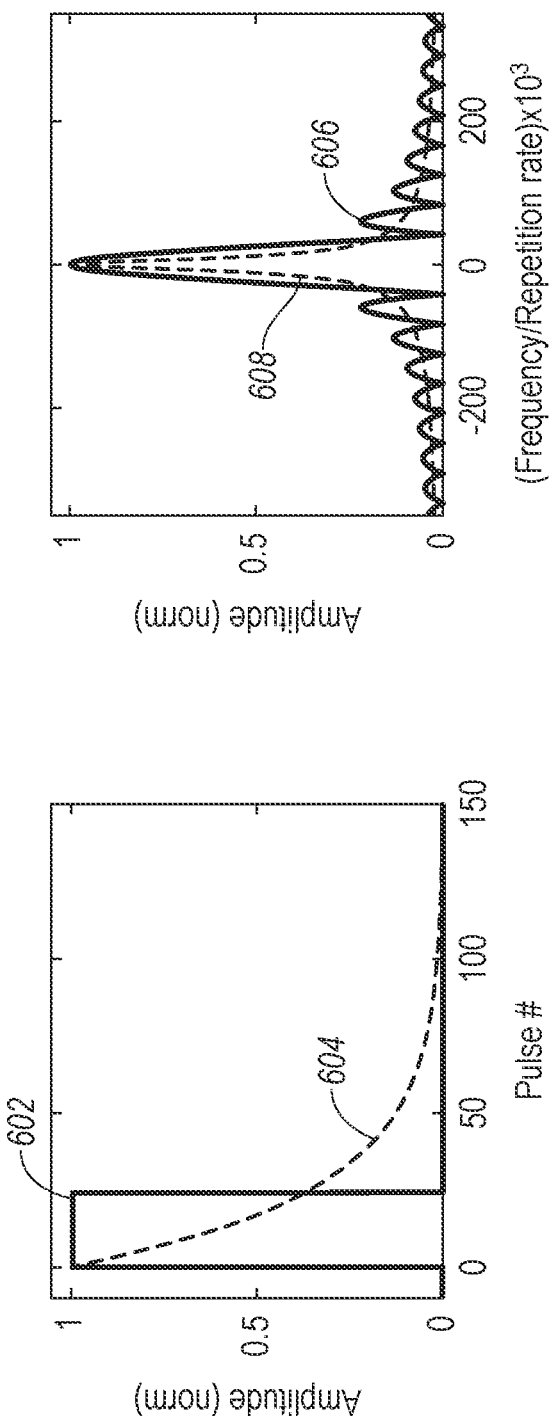
FIG. 6A is a graph of an example moving average filter response and an example exponential low-pass filter response in the time domain.
FIG. 6B is a graph of an example moving average filter transfer function and an example exponential low-pass filter transfer function in the frequency domain.

Simulating these two filters over a wide range of integration times reveals that the box lock-in detector within a defined parameter space excels over the exponential lock-in detector for all effective time constants. FIGS. 6A and 6B show respectively time-domain and frequency domain responses of these two types of filters. Curves 602 and 606 show respectively the transfer functions of the moving average filter in the time domain and frequency domain. Curves 604 and 608 show respectively the transfer function of the exponential low-pass filter in the time domain and frequency domain.

Referring to the curve 602, the low-pass filter 212 in a box lock-in detector 206 is a moving average filter 212. It is characterized by a wait time equal to the number of samples N in the averaging function. The wait time corresponds to the width of the pulse in the curve 602 of FIG. 6A. An advantage of the moving average filter 212 is that the frequency-domain response contains notches, wherein notches are minimums in the transfer function shown in the curve 606 in FIG. 6B. By selecting the wait time of the box lock-in detector 206 and modulations frequencies, the notches in the transfer curve can be aligned with frequencies corresponding to the pump and probe modulation frequencies $\Omega_1$ and $\Omega_2$, providing for more effective suppression of these signals. Because of the mixing step used in this example, the notch frequencies of the moving average filter are located at the pump and probe frequencies mixed with the reference frequency, which is $\Omega1-\Omega2$. After mixing, the frequencies corresponding to the pump frequency are $\Omega 2$, and $\Omega1-\Omega2$, and the frequencies corresponding to the probe frequency are $\Omega 1$, and $\Omega2-\Omega1$. The moving average filter also has a notch at $\Omega1-\Omega2$, which is the frequency to which the 0 Hz part of the signal S146 has been shifted. This type of filtering provides for a reduced detection time for the box lock-in detector in comparison to the exponential lock-in detector.

Aligning the notches in the response of the box lock-in detector's 206 moving average filter 212 can be achieved by meeting two conditions. First, the wait time of the moving average filter 212 must be an integer number of periods of each of the frequencies that are to be suppressed. Second, all the modulation periods should be integer multiples of the sample period, wherein the sample period is the time between data points measured from the photodetector 144 that is digitized by the signal processing electronics. At its fundamental limit the sample rate is equal to the repetition rate of the source beam S112. Sample rates lower than the repetition rate of the source beam S112 can also be used.

In the example above, wherein the source beam S112 repetition rate is 120 MHZ, the pump beam frequency is 60 MHz and the probe beam frequency is 40 MHZ, the moving average filter wait time can be any whole number multiple of 50 ns. The frequency domain response of the moving average filter has notches at positive and negative multiples of 20 MHZ.

The box lock-in detector 206 above is only an example of a system that can be designed with notches placed at frequencies to be suppressed. Other finite impulse response (FIR) filters and infinite impulse response (IIR) filters can be created such that notches are placed at notch frequencies to suppress corresponding demodulation frequencies. These filters can be placed before or after the mixer in other examples of lock-in-type detectors. In cases where the filters are placed before the mixer, the frequencies corresponding to the modulation frequencies are equal to the modulation frequencies. A signal processing method with a nearly equivalent transfer function as the box lock-in detector 206 is the use of a discrete Fourier transform, where the coefficients for all frequencies except the signal of interest are set to zero, and only the coefficient for the frequency of the signal of interest is output. There are also notch implementations using IIR filters that could be used, though these implementations will require longer wait times than the use of finite impulse response filters.

Figure 7A:
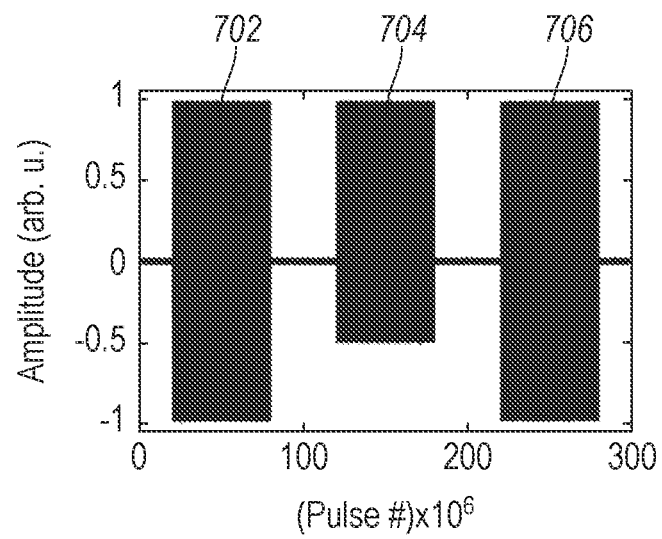
FIG. 7A is a graph of an example test simulation signal in the time domain.

FIGS. 7A-7D illustrates advantages of using a filter with notches that suppress modulation signals other than a modulation including the signal of interest. FIG. 7A is a graph in the time domain of three pulse modulated bursts. The first burst 702 is a modulation frequency that corresponds to $\Omega_1$. The second burst 704 is a modulation frequency that corresponds to $\Omega_2$, and the third burst 706 is a modulation frequency that corresponds to $\Omega_1-\Omega_2$. A white noise background is superimposed on all three bursts.

The three pulse bursts, via simulation, are demodulated using a pump-probe frequency, and the resulting signal passed through a conventional 4-pole exponential filter and a finite impulse response (FIR) box filter.

Figure 7B:
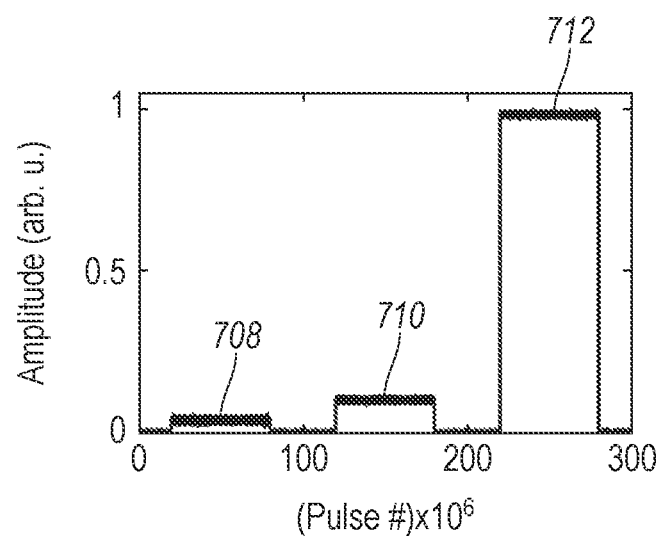
FIG. 7B is a graph in the time domain of the example test simulation signal of FIG. 7A after filtering by a simulated exponential lock-in detector.

FIG. 7B shows the detection of each of the bursts after demodulation and filtering with the four-pole exponential filter. The burst 708 shows the breakthrough of the signal modulated at $\Omega_1$, the burst 710 shows the breakthrough of $\Omega_2$, and the burst 712 shows the detection of $\Omega_1-\Omega_2$.

Figure 7C:
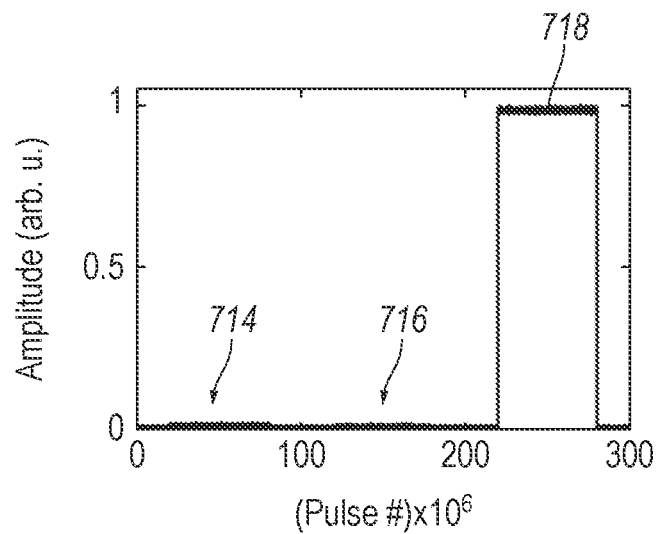
FIG. 7C is a graph in the time domain of the example test simulation signal of FIG. 7A after filtering by a simulated box lock-in detector.

FIG. 7C shows the detection of each of the bursts after the demodulated signal is passed through a FIR moving average filter. The burst 714 shows minimal breakthrough of the signal modulated $\Omega_1$, the burst 716 shows minimal breakthrough of $\Omega_2$, and the burst 718 shows the detection of $\Omega_1-\Omega_2$. Together FIGS. 7B and 7C show superior suppression of $\Omega 1$ and $\Omega 2$ modulation frequencies by the box lock-in detector.

Figure 7D:
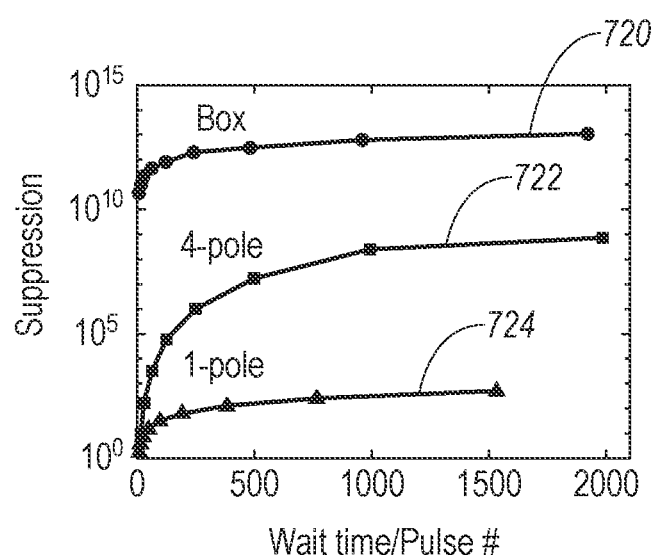
FIG. 7D is a graph of suppression of modulation frequencies for different filter types.

In FIG. 7D, the suppression of the $\Omega_1$ and $\Omega_2$ modulation frequencies is compared for various lock-in detector filter types for a range of sampling periods. Here, the linear interference signals (i.e., the modulation frequencies) are much stronger at the photodetector than the pump-probe signal S142. A suppression on the order of $10^7$ or more may be required for the signal to exceed the background by at least one order of magnitude. Curve 720 shows the suppression of modulation frequencies by a box lock-in detector as a function of the number of samples in the filter wait time. Curve 722 shows the modulation frequency suppression of a four-pole exponential lock-in detector as a function of the number of samples in the filter wait time. Curve 724 shows the modulation frequency suppression for a one-pole exponential filter as a function of the number of samples in the filter wait time. For low sampling periods, which are necessary for rapid imaging, the box lock-in detector is much more effective at suppressing the $\Omega_1$ and $\Omega_2$ modulation frequencies than the exponential lock-in detectors.

The units of the wait time, or time-constant, axis in FIG. 7D are normalized by the sampling period, which here is set equal to the repetition rate of the laser.

Pump-probe measurements, as described herein, can be used to determine characteristics of the material that is measured. Depending on the bandwidths of the pump and probe, a high pump-probe signal can be indicative of either a material defect or a high quality (defect free) material. For the pump and probe beams covering a same optical bandwidth that are tuned to an energy slightly below the bandgap of a semiconductor, a high amplitude of the signal of interest may be an indication of a defect at the measured location.

For the pump and probe beams covering a same optical bandwidth that are tuned to match an exciton resonance in semiconductors such as $MoSe_2$ that exhibit an exciton resonance, a low amplitude of the signal of interest may be an indication of a degraded sample at the measured location. For pump and probe beams having different optical bandwidths, other defects can be used to identify defects based on a high or low pump-probe signal. One subset of nonlinear imaging is called stimulated Raman scattering (SRS) microscopy, wherein the pump and probe beams are tuned to resonantly excite specific vibrational modes of the material. Those vibrational Raman modes can also be good indicators of defects.

Figure 8:
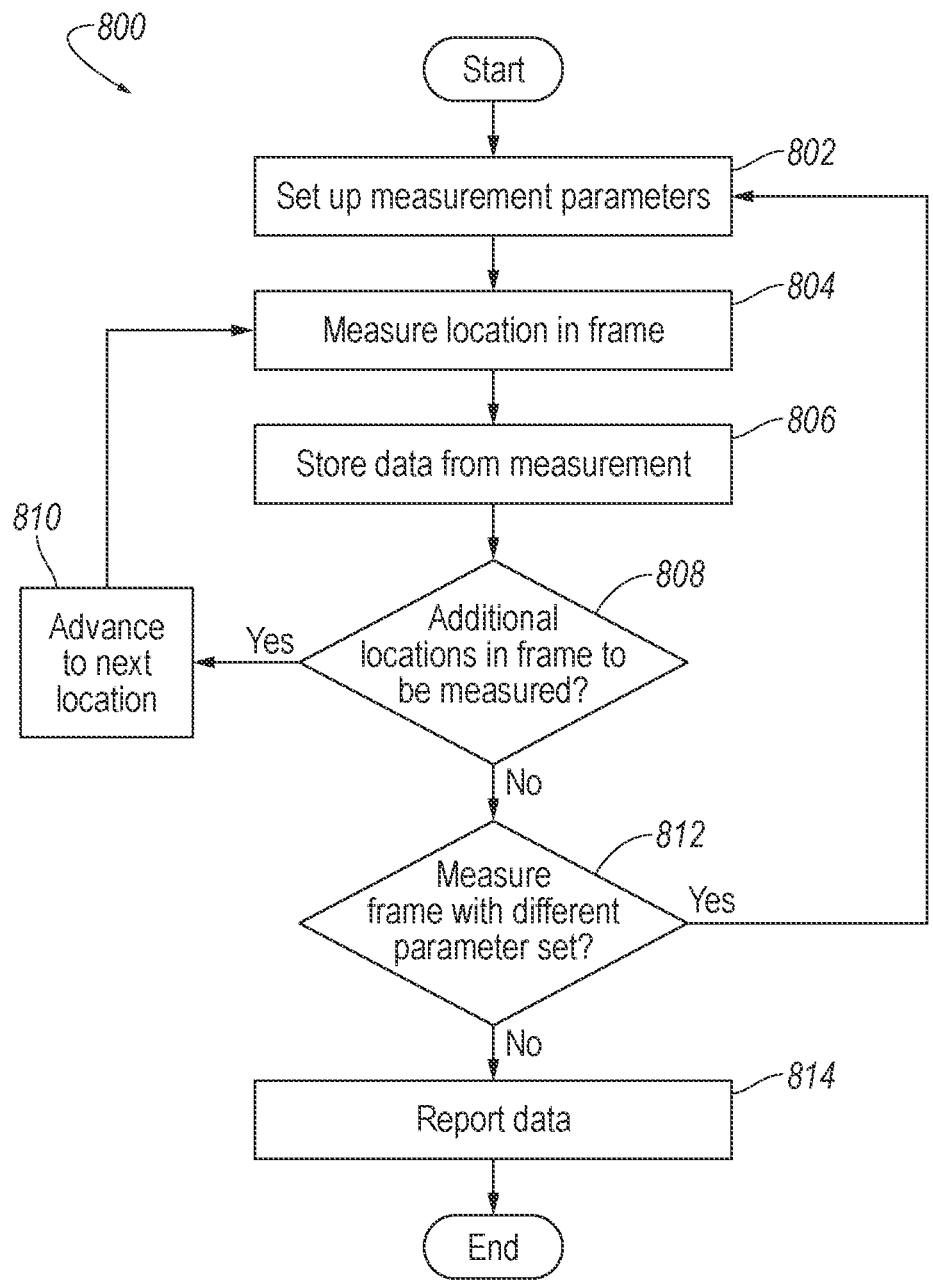
FIG. 8 is a flow diagram of an example process for performing pump-probe measurements on a material.

FIG. 8 is a flow diagram of an example process 800 for performing pump-probe imaging measurements on a material 140, with the example system 100. A frame, in this context, is an area on the material 140 including two or more pixels measured with a single pulse delay. A pixel, in this context, is a location on a material 140 for which data is collected and stored. The location can be identified, for example, based on coordinates in either a Cartesian or radial coordinate system. The process 800 starts in a block 802.

In the block 802, parameters for measuring the material 140 are set-up. For example, the control subcircuit 166 in the electronic circuit 160, based on input from a user, can set up the modulation frequency $\Omega_1$ for signal S122, the modulation frequency $\Omega_2$ for signal S124 and the delay through the delay block 118. The control subcircuit 166 can further set the type of filtering to be performed by the signal processing subcircuit 164. In the case of selecting a box lock-in detector type, the control subcircuit 166 can set the wait time. Further, the control subcircuit 166 can set up the parameters for scanning the material 140. For example, control subcircuit 166 can set up the step vector (size and direction) along the material 140 from one location to a next location in either Cartesian or radial coordinates. Upon setting up the measurement and scanning parameters, the process 800 continues in a block 804.

In the block 804, the control subcircuit 166 performs a measurement at a location on the material 140. As described above, a light source 104 generates a source beam S112. Via the first modulator 114 and the second modulator 116, the electronic circuit 160 generates a pump beam S126 with a frequency $\Omega_1$ and a probe beam S128 with a frequency $\Omega_2$. In some cases, the electronic circuit 160 can establish a temporal delay between the pump beam S126 and probe beam S128 via the delay block 118. Via optical components, the pump beam S126 and probe beam S128 are combined to form an excitation beam S132 that is directed to a location on the material 140. The material 140 generates a non-linear response beam S142 that is directed to photodetector 144 that generates an electrical signal S146 based thereon. The signal processing electronics, based on parameters established by control subcircuit 166, discriminates a signal of interest from the electrical signal S146 using all sample points from the wait time. The process 800 continues in a block 806.

In the block 806, the control subcircuit 166 stores data from the signal of interest for the measured pixel in memory, together with coordinates identifying a location of the pixel on the material 140. Upon storing the data, the process 800 continues in a block 808.

In the block 808, the control subcircuit 166 determines if additional pixels within the frame are to be measured. In the case that additional frames need to be measured, the process 800 continues in a block 810. Otherwise, the process 800 continues in a block 812.

In the block 810, the electronic circuit 160 displaces the excitation beam S132 relative to the material 140 via the scan mechanism 154, as described above. In an example, the material 140 is a semiconductor wafer. In this case, the scan mechanism 154 can rotate the wafer relative to the excitation beam S132 or displace the wafer along an axis in a Cartesian coordinate system to a new location. The process 800 then continues in the block 804, and starts a measurement at the new location.

After all locations in the frame have been measured, the process 800 continues to block 812. In the block 812, which can follow the block 808, the control subcircuit 166 determines if additional measurements are to be made with a different set of measurement parameters. For example, in some cases, it may be desired to measure a respective decay time at locations on the material. A detected longer decay time at a location may be an indication of a defect, sometimes called a trapped state. In order to measure a decay map, multiple sets of identical location measurements with each with a different delay between the pump beam S126 and the probe beam S128 can be used to determine the ultrafast decay time of the material 140 at each pixel in the frame. In the case that additional measurements with different measurement parameters are to be performed in the frame, the process 800 continues in the block 802, and establishes the new measurement parameters. Otherwise, the process 800 continues in a block 814.

In the block 814, the control subcircuit 166 can report that the measurements of all frames are completed, and can further report the collected data. For example, the electronic circuit 160 can output a value of one or more characteristics of the signal of interest S142 for locations on the material 140. The characteristics of the signal of interest S142 can include an amplitude and can further include a phase of the signal of interest S142. The electronic circuit 160 may output the data in the form of digital data for each location, or an analog signal. The data may be output to a computing device such as the computing device 170, a display, and or to a measurement device such as an oscilloscope. In other cases, the electronic circuit 160 may store the data for later retrieval. The process 800 ends.

Figure 9:
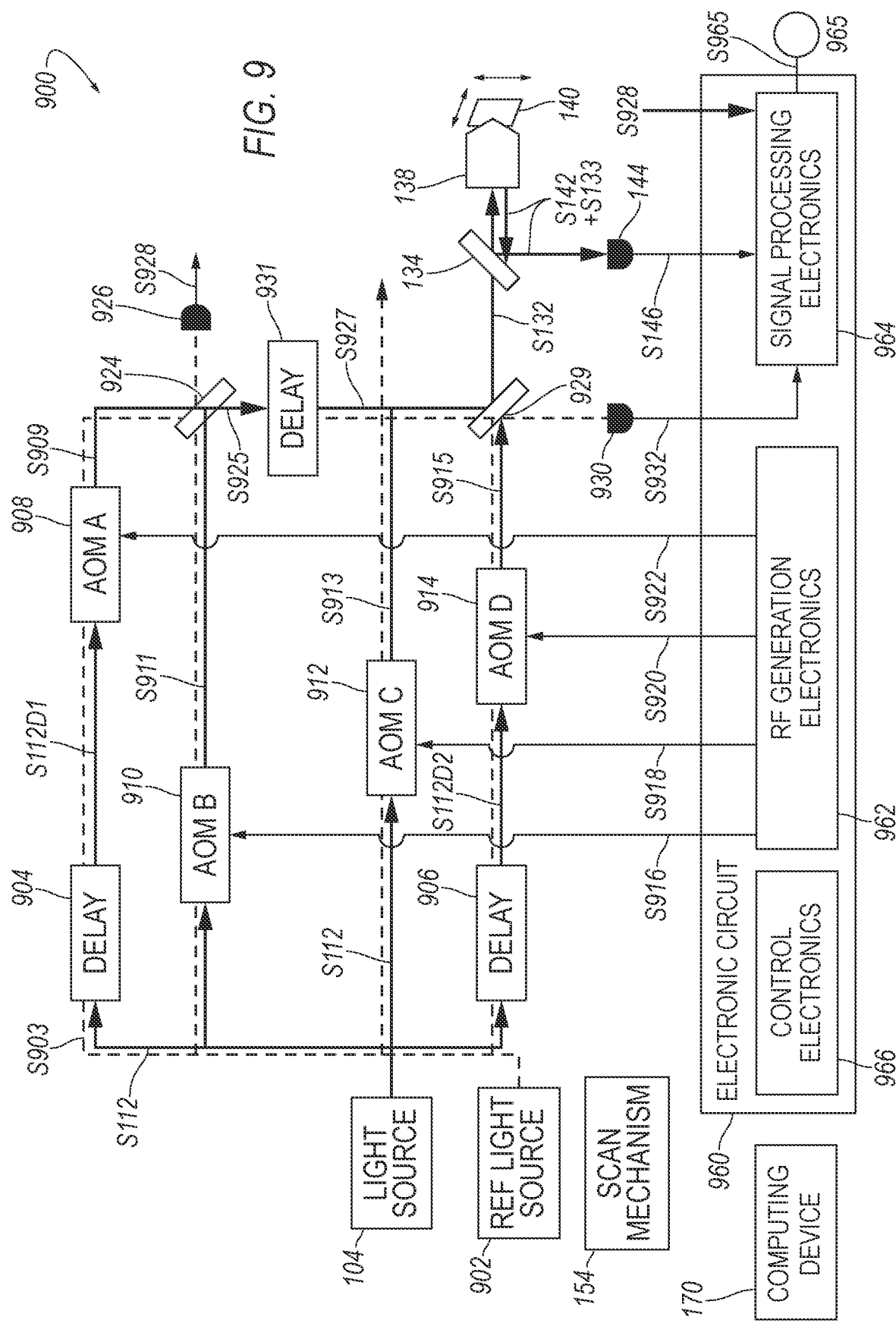
FIG. 9 is a diagram of an example system for detecting characteristics of materials.

FIG. 9 is a block diagram of an example system 900 designed for controlling a four-pulse pulse sequence. The four-pulse pulse sequence enables more complete measurement of additional characteristics of the third-order nonlinear signal generated at the material 140 in comparison to the two-pulse sequence described in reference to FIG. 1. In the example system 900, like or similar elements to FIG. 1 retain the same reference symbols.

The system 900 includes a light source 104 and a reference light source 902. The light source 104 generates a source beam S112, and can be, for example, an ultrafast laser as described in reference to FIG. 1.

The reference light source 902 can be a laser that generates a continuous wave reference beam S903. The reference laser has a coherence length that exceeds the maximum timing delays created by the delay blocks 904 and 906. The wavelength is typically outside the bandwidth of the first light source so that the reference laser can be spectrally filtered from the first light source. In an example, this reference laser is a single-longitudinal-mode Nd:YAG laser with a 1064 nm wavelength and a 10 meter coherence length.

The system 900 includes four modulators: a first modulator 908 (AOM_A), a second modulator 910 (AOM_B), a third modulator 912 (AOM_C), and a fourth modulator 914 (AOM_D). Each of these modulators may be, for example, an acousto-optic modulator as described in reference to the first and second modulators 114, 116 of FIG. 1. However, the driving signal of the modulators is a single frequency without any amplitude modulation. They receive as a first input a light beam, which, in the example system 900 is the source beam S112. As a second input, they receive a respective radio-frequency signal. Each of the four modulators, 908, 910, 912, 914 frequency shifts the light beam based on the respective radio-frequency signals received as a second input. This frequency shift can also be called single-sideband phase modulation.

The system 900 further includes three delay blocks, a first delay block 904, a second delay block 906 and a third delay block 931. As described above in reference to the delay block 118 of FIG. 1, each of the delay blocks 904, 906, 931 can be a mirror in an optical path having a position that can be adjusted to vary a length of the optical path.

In the system 900, the light source 104 generates the source beam S112. The source beam S112 is split into four optical paths, as described below.

A first optical path (the AOM_A path) includes the first delay block 904 and the first modulator 908, and generates a first beam S909. In the AOM_A path, the first modulator 908 phase modulates the source beam S112, delayed based on the first delay block 904, with the signal S922 such that the first beam S909 is frequency-shifted by frequency QA.

A second optical path (the AOM_B path) includes the second modulator 910 and generates a second beam S911. The second modulator 910 phase modulates the source beam S112 with the signal S916 such that the second beam S911 is frequency-shifted by a frequency 2B.

A third optical path (the AOM_C path) includes a third modulator 912 and generates a third beam S913. The third modulator 912 phase modulates the source beam S112 with the signal S918 such that the third beam S913 is frequency-shifted by a frequency QC.

A fourth optical path (the AOM_D path) includes the second delay block 906 and a fourth modulator 914 and generates a fourth beam S915. The fourth modulator 914 phase modulates the source beam S112, delayed based on a delay from the second delay block 906, with the signal S920 such that the fourth beam S915 is frequency-shifted by a frequency $\Omega_D$.

To relate the four-pulse measurement to the pump-probe example provided earlier, a difference of $\Omega_A$ and $\Omega_B$ is $\Omega_1$, and a difference of $\Omega_C$ and $\Omega_D$ is $\Omega_2$. All four beams are combined via a first beam splitter 924 and a second beam splitter 929 to generate the excitation beam S132.

The continuous wave reference beam S903 is split into four optical paths and is used to sample the AOM driving frequencies and path length fluctuations of the AOM_A path, the AOM_B path, the AOM_C path and the AOM_D path. After the first beam S909 from the AOM_A path and the second beam S911 from the AOM_B path are combined, an interference from the reference beam S903 is measured with the photodetector 926. Because the first beam S909 and the second beam S911 are frequency shifted, their interference will be modulated at the difference of their modulation frequencies, or $\Omega_1$. The modulation may also include Doppler shifts due to relative movements of the optics in each beam. Based on the excitation from the combined first beam S909 and second beam S911, the photodetector 926 generates a signal S928 which will be at a single frequency $\Omega_1$ that can be used to demodulate the optical signals in the electronic circuit 960.

After the third beam S913 from the AOM_C path and the fourth beam S915 from the AOM_D path are combined, the reference beam S903 interference between these two optical paths is measured by the photodetector 930 to generate the signal S932. This signal has a modulation frequency $\Omega_2$ equal to a difference in the frequencies $\Omega_C$ and $\Omega_D$. The electronic circuit 960 also uses the signal S932 for demodulation. After the four beams, S909, S911, S913 and S915 are combined at the beam splitter 929, the optical path is identical to the previous pump-probe example in FIGS. 1 and 2.

The electronic circuit 960 can perform multiple operations for the system 900 including generating the RF signals used to modulate the Source beam S112, adjusting parameters of the optical subsystem including the delays generated by the delay blocks 904, 906 and 931, discriminating the photodetector output signal S146 to determine values of characteristics of the signal of interest, and controlling the scan mechanism 154 and other elements of the system 900 such as the light source 104 and the reference light source 902, and outputting values of characteristics of the signal of interest S142 to a computing device such as the computing device 170, a display or an analog output. The electronic circuit 960 includes electronic components such as resistors, capacitors, inductors, and transistors. It further includes logic elements such as logic gates, flip-flops, and registers. Still further, it can include one or more processors and one or more data storage elements. In an example, the electronic circuit can include a storage element that stores instructions for a processor for setting up, adjusting, or performing operations with other elements in the system 900. The electronic circuit 960 can be or include one or more FPGAs, integrated circuits and/or circuits on a substrate or printed circuit board.

As shown in FIG. 9, the electronic circuit 960 can include one or more subcircuits including an RF generation subcircuit 962, a signal processing subcircuit 964 and a control subcircuit 966. Each of these subcircuits can be one, or a combination of a software module, a firmware module or a hardware module that performs the functions related to the respective subcircuit.

The RF generation subcircuit 962 can generate RF signals for modulating the source light beam S112 to generate modulated light beams such as the light beams S909, S911, S913 and S915 described above.

The signal processing subcircuit 964 receives and processes the photodetector 144 output signal S146 to discriminate a signal of interest included in the output signal S146. The signal processing subcircuit 964 further receives and processes the photodetector 926 output signal S928 and the photodetector 930 output signal S932 to generate a demodulation signal used to discriminate the signal of interest in the signal S146. The operation of the signal processing subcircuit 964 is described below in reference to FIG. 10.

The electronic circuit 960 further includes a port 965 for output data from the signal processing electronics to devices such as the computing device 170, a display, or a measurement device such as an oscilloscope. The port 965 can include one or more electrical connections to support different digital bus configurations or the outputting of one or more analog signals.

Figure 10:
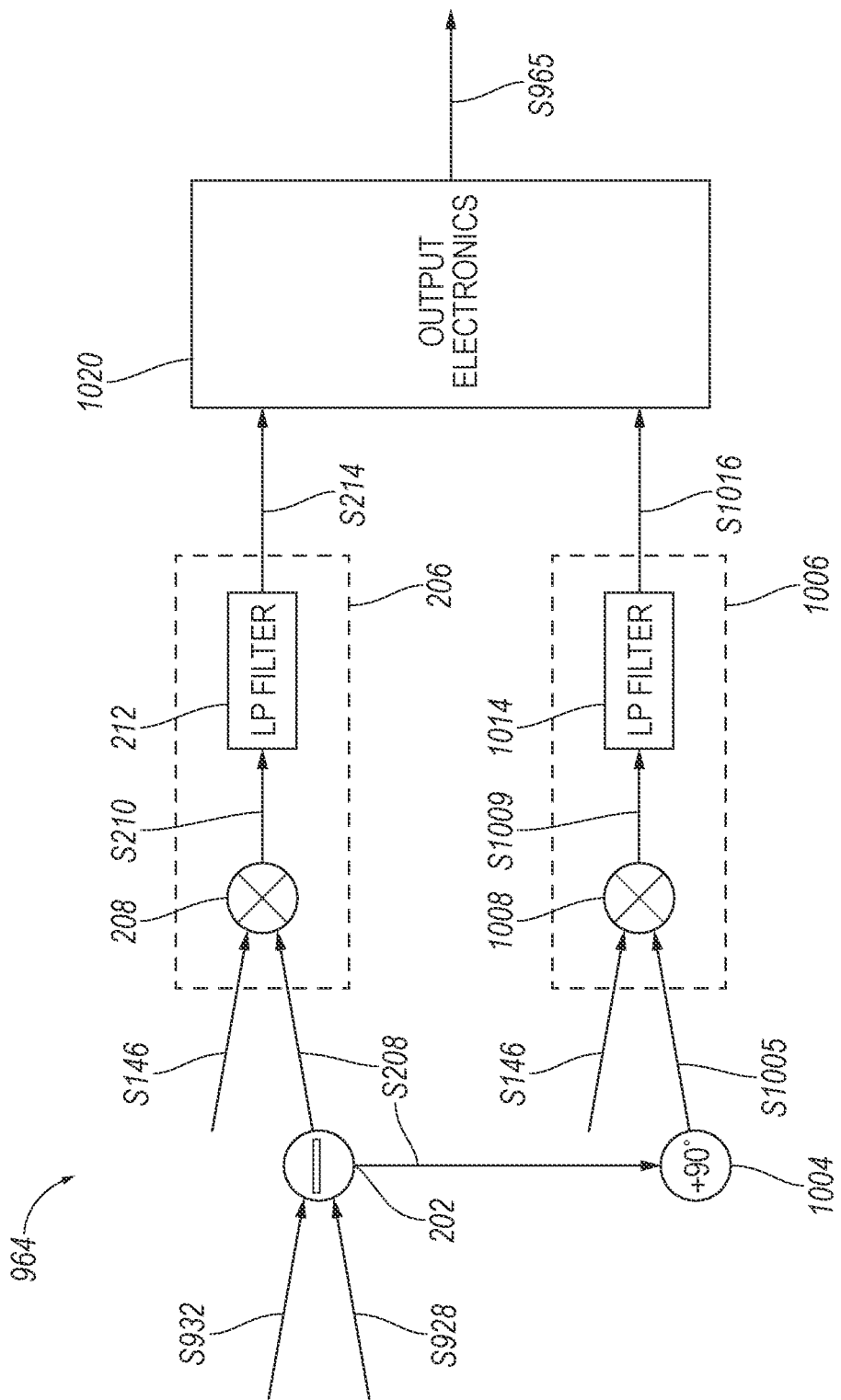
FIG. 10 is a schematic diagram of an example signal processing subcircuit for processing a signal received from a material by the system of FIG. 9.

FIG. 10 is a block diagram illustrating the signal processing subcircuit 964 included in the electronic circuit 960. The signal processing subcircuit 964 is an electronic circuit, which can include one or more processors, memory, and other electronic circuits. As shown in FIG. 10, the signal processing subcircuit 964 includes a difference generator 202, a first lock-in-type detector 206 including a first mixer 208 and a first filter 212, a second lock-in-type detector 1006 including a second mixer 1008 and a second filter 1014, and output electronics 1020 wherein each of these components can be one of a software module, a firmware module, a hardware module, or any combination thereof. The signal processing subcircuit 964 can be programmed, for example, to adjust parameters of the first lock-in-type detector 206 and the second lock-in-type detector 1006 such as the type of low-pass filter, the coefficients of the filter, and the wait time or time constant of the filter. In an example, the first low-pass filter 212 and second low-pass filter 1014 are moving average filters as described above.

In the signal processing subcircuit 964, the difference generator 202 generates a reference signal S208 based on the signals S928 and S932. In four-pulse measurements the phase of the signal S146 is also an important quantity to measure. Measuring the phase of signal S146 requires measuring two orthogonal quadratures of the signal S146. The combination of the first mixer 208 and the first low-pass filter 212, included in the lock-in-type detector 206, measure a first quadrature in a similar manner as described in reference to the signal processing subcircuit 164 to generate an output signal S214. A second quadrature is measured by phase shifting the reference signal S208 by 90 degrees with the phase shifter 1004 to generate the phase shifted reference signal S1005, which is passed to the second lock-in-type detector 1006 including the second mixer 1008 and the low-pass filter 1014. The second mixer 1008 then mixes the signal S146 with the phase-shifted reference signal S1005 to generate the signal S1009. The second low-pass filter 1014 receives and filters the signal S1009 to generate the signal S1016. The signals S214 and S1016 are orthogonal quadratures of the four-wave mixing signal. These orthogonal quadratures can be used to recover the amplitude and phase of the signal S146.

The output electronics 1020 receives the signal S214 including the value proportional to an amplitude of the signal of interest S142 and, by measuring an orthogonal quadrature to the signal of interest S1016, a value proportional to the phase of the signal of interest S142. Based on the signals S214 and S1016, the output electronics generates an output signal S965 that is output to a port 965. In an example, the output signal S965 can be digital data including a digital value for the amplitude of the signal of interest, equal to the magnitude of the two quadrature components that are the real part of S142 and the real part of S1016, and a digital value for the phase of the signal of interest equal to the mathematical operation atan 2 applied to the real part of S1016 and the real part of S142. The output signal S965 can also be a digital value for amplitude of the X-quadrature of the signal of interest, which is the real part of S142, and a digital value for the amplitude of the Y-quadrature of the signal of interest, which is the real part of S1016. The digital data can be output via the port 965 to a computing device such as the computing device 170, output to a display, or output as a first analog value proportional to the amplitude of the signal of interest S142 and a second analog signal proportional to the phase of the signal S142. In some cases, the output electronics 1020 may output the signals S214 and S1016 directly to the port 965. In other cases, the output electronics may convert the signals S214 and S1016 to a format for transmission via a bus such as a Universal Serial Bus (USB). In other cases, the output electronics 1020 may convert the digital signals S214 and S1016 to respective analog signals using, for example, a digital to analog converter, and output the analog signals to the port 965.

As with the example system 100 described above, a first low-pass filter 212 wait time and a second low-pass filter wait time can be designed to be an integer number of periods of the modulation frequencies that appear in the signal S146 generated by the photodetector 144 based on the non-linear response signal S142.

The additional phase information determined from four-pulse measurements can be used to measure how the phase evolves with delay. Recording this phase evolution and then Fourier transforming the recorded set of signals is used to generate spectra. Four-pulse measurements enable spectrally resolving one or both of the pump and probe beams. There are varied applications for these types of measurements. In an example, measuring both the pump and probe spectra is used to determine how strongly two adjacent layers of two different semiconductor materials are coupled at the measured location.

All terms used in the claims are intended to be given their plain and ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The term "based on" herein means based on in whole or in part.

The term "exemplary" is used herein in the sense of signifying an example, e.g., a reference to an "exemplary widget" should be read as simply referring to an example of a widget.

In the drawings, the same reference numbers indicate the same elements. Further, some or all of these elements could be changed.

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance. Examples of computing devices include, without limitation, network devices such as a gateway or terminal, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, Verilog, VHDL, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. An electronic circuit comprising:
signal processing electronics comprising:
a filter; and
output electronics; wherein the signal processing electronics is configured to:
receive, by receive circuitry included in the signal processing electronics, an electrical signal from a photodetector, wherein the electrical signal is generated by the photodetector based on a light beam from a location on a material including a signal of interest and one or more modulation frequencies;
discriminate, by the filter, a portion of the electrical signal proportional to at least one characteristic of the signal of interest from other components of the electrical signal using a filter having a filter transfer function including a notch at a notch frequency corresponding to one of the one or more modulation frequencies;
determine, by the filter, a value for the at least one characteristic of the signal of interest from the discriminated portion of the electrical signal; and
output, by the output electronics, the value of the at least one characteristic of the signal of interest,
wherein:
the filter operates on samples of the electrical signal having a sample rate period:
the one or more modulation frequencies include a first modulation frequency; and
the first modulation frequency is selected such that a period of the first modulation frequency is an integer number of the sample rate period.

2. The electronic circuit of claim 1, wherein:
the filter transfer function includes a notch frequency at a frequency corresponding to each of the one or more modulation frequencies.

3. The electronic circuit of claim 1, wherein the light beam from the location on the material includes a nonlinear optical response from the material.

4. The electronic circuit of claim 1, wherein the at least one characteristic of the signal of interest is an amplitude and/or a phase of a non-linear optical response included in the light beam from the location on the material.

5. The electronic circuit of claim 1, wherein the filter with the filter transfer function including the notch frequency corresponding to the modulation frequency is a low pass finite impulse response filter.

6. The electronic circuit of claim 1, wherein a wait time of the filter is an integer multiple of a respective period of each of the notch frequencies corresponding to the respective modulation frequencies.

7. The electronic circuit of claim 6, wherein the wait time is an integer number of a period of pulses in a light beam used to excite the location at the material.

8. The electronic circuit of claim 1, wherein:
the one or more modulation frequencies include a first modulation frequency and a second modulation frequency; and
discriminating the signal of interest from the signal received from the photodetector includes demodulating the signal received from the photodetector with a demodulation signal that is a difference of the first modulation frequency and the second modulation frequency.

9. The electronic circuit of claim 8, wherein the electronic circuit is further configured to:
receive a second signal from a second photodetector including the first modulation frequency;
receive a third signal from either the second photodetector or a third photodetector including the second modulation frequency; and
generate the demodulation signal by forming a difference of the second signal and the third signal.

10. A system comprising:
an optical subsystem, wherein the optical subsystem is configured to excite a location on a material;
a photodetector; and
an electronic circuit, wherein the electronic circuit is configured to:
receive an electrical signal from the photodetector, wherein the electrical signal is generated by the photodetector based on a light beam from the location on the material including a non-linear signal of interest and one or more modulation frequencies;
discriminate a portion of the electrical signal proportional to at least one characteristic of the non-linear signal of interest from other components of the electrical signal using a low pass filter including a filter transfer function including a notch at a notch frequency corresponding to one of the one or more modulation frequencies;
determine a value for the at least one characteristic of the non-linear signal of interest from the discriminated portion of the electrical signal; and
output, by the output electronics, the value of the at least one characteristic of the signal of interest,
wherein:
the filter operates on samples of the electrical signal having a sample rate period;
the one or more modulation frequencies include a first modulation frequency; and
the first modulation frequency is selected such that a period of the first modulation frequency is an integer number of the sample rate period.

11. The system of claim 10, wherein the filter transfer function includes a notch frequency at a frequency corresponding to each of the one or more modulation frequencies.

12. The system of claim 10, wherein the at least one characteristic of the non-linear signal of interest is an amplitude and/or a phase of a non-linear optical response included in the light beam from the location of the material.

13. The system of claim 10, wherein a wait time of the low pass filter is an integer number of a period of pulses in a light beam used to excite the location at the material.

14. The system of claim 10, wherein the low pass filter with the transfer function including the notch frequency corresponding to the modulation frequency is a low pass finite impulse response filter.

15. The system of claim 10, wherein a wait time of the filter is an integer multiple of a respective period of each of the notch frequencies corresponding to the respective modulation frequencies.

16. A method comprising:
illuminating, via a modulated light source, a location on a material with a beam of light including one or more modulation frequencies;
detecting, via a photodetector, a signal of interest, wherein the signal of interest is light generated by a nonlinear optical process that results from interaction of the beam of light and the material, wherein the signal of interest comprises spectral components that have frequencies within 1 THz of spectral components of the beam of light;
receiving, by an electronic circuit, an electrical signal generated by the photodetector in response to detecting the signal of interest;
discriminating a portion of the electrical signal including at least one characteristic of the signal of interest from other components of the electrical signal using a low pass filter with a transfer function including a notch at a notch frequency corresponding to the one of the one or more modulation frequencies; and
identifying, based on the discriminated portion of the electrical signal, the at least one characteristic of the signal of interest, wherein:
the at least one characteristic of the signal includes an amplitude and/or a phase of the signal of interest, and wherein:
a wait time of the low pass filter is an integer number of a period of pulses in a light beam used to excite the location at the material;
the low pass filter operates on samples of the electrical signal having a sample rate period;
the one or more modulation frequencies include a first modulation frequency; and
the first modulation frequency is selected such that a period of the first modulation frequency is an integer number of the sample period.

17. The method of claim 16, wherein the low pass filter with the transfer function including the notch frequency corresponding to the modulation frequency is a low pass finite impulse response filter.

* * * * *